United States Patent
Yamane et al.

(10) Patent No.: US 8,086,056 B2
(45) Date of Patent: Dec. 27, 2011

(54) ENCODING DEVICE AND METHOD, DECODING DEVICE AND METHOD, AND PROGRAM

(76) Inventors: Kenji Yamane, Tokyo (JP); Eisaburo Itakura, Kanagawa (JP); Takahiro Fukuhara, Kanagawa (JP)

( * ) Notice: Subject to any disclaimer, the term of this patent is extended or adjusted under 35 U.S.C. 154(b) by 1497 days.

(21) Appl. No.: 11/408,058

(22) Filed: Apr. 21, 2006

(65) Prior Publication Data

US 2006/0239572 A1    Oct. 26, 2006

(30) Foreign Application Priority Data

Apr. 26, 2005   (JP) ................................ 2005-128037

(51) Int. Cl.
*G06K 9/46* (2006.01)

(52) U.S. Cl. ........................................ 382/248; 382/238

(58) Field of Classification Search .................... None
See application file for complete search history.

(56) References Cited

U.S. PATENT DOCUMENTS

| | | | | |
|---|---|---|---|---|
| 5,675,393 | A * | 10/1997 | Chida | 348/598 |
| 5,754,794 | A * | 5/1998 | Bernardini et al. | 709/247 |
| 6,813,591 | B1 * | 11/2004 | Ohwi | 703/2 |
| 7,164,393 | B2 * | 1/2007 | Leslie | 345/31 |
| 7,218,785 | B2 * | 5/2007 | Sharma et al. | 382/232 |
| 7,254,275 | B2 * | 8/2007 | Tabesh et al. | 382/248 |
| 7,433,541 | B2 * | 10/2008 | Fukuhara et al. | 382/284 |
| 7,734,104 | B2 * | 6/2010 | Yamane et al. | 382/232 |
| 7,742,649 | B2 * | 6/2010 | Tabesh et al. | 382/248 |
| 7,859,584 | B2 * | 12/2010 | Santo et al. | 348/333.05 |
| 2001/0019354 | A1 * | 9/2001 | Einarsson et al. | 348/14.09 |
| 2002/0057705 | A1 * | 5/2002 | Hagai et al. | 370/410 |
| 2004/0061780 | A1 * | 4/2004 | Huffman | 348/148 |
| 2004/0151358 | A1 * | 8/2004 | Yanagita et al. | 382/132 |
| 2004/0252759 | A1 * | 12/2004 | Winder et al. | 375/240.12 |
| 2005/0018919 | A1 * | 1/2005 | Shiraishi et al. | 382/254 |
| 2005/0074178 | A1 * | 4/2005 | Montrone et al. | 382/240 |
| 2006/0120626 | A1 * | 6/2006 | Perlmutter et al. | 382/294 |
| 2006/0158510 | A1 * | 7/2006 | Lia et al. | 348/14.08 |
| 2007/0291140 | A1 * | 12/2007 | Baba et al. | 348/240.99 |
| 2007/0297681 | A1 * | 12/2007 | Wenzel | 382/209 |
| 2008/0075165 | A1 * | 3/2008 | Ugur et al. | 375/240.12 |
| 2008/0112014 | A1 * | 5/2008 | Sato | 358/401 |
| 2008/0247467 | A1 * | 10/2008 | Rusanovskyy et al. | 375/240.16 |

FOREIGN PATENT DOCUMENTS

| | | |
|---|---|---|
| JP | 2004-7266 | 1/2004 |
| JP | 2004-135107 | 4/2004 |
| JP | 2008079221 A * | 4/2008 |

OTHER PUBLICATIONS

Fujihira, Tatsu and Kawaguchi, Atsuo, "Image processing apparatus and method," machine translation of Japanese application 2004-135107, Apr. 2004.*

* cited by examiner

*Primary Examiner* — Vu Le
*Assistant Examiner* — Xuemei Chen
(74) *Attorney, Agent, or Firm* — Finnegan, Henderson, Farabow, Garrett & Dunner, LLP

(57) ABSTRACT

Described herein are methods and devices for encoding and decoding data. An encoding device can be configured to encode video by performing intra-frame encoding using wavelet transformation. The encoding device can include a generation unit configured to generate a composite image for every n temporally consecutive frames, and an encoding unit configured to perform the encoding for the composite image. The decoding device can be configured to decode data encoded by such an encoding device.

10 Claims, 24 Drawing Sheets

FIG. 19

| bitrate[bpp] | | 0.4 | 0.5 | 0.7 | 1.0 |
|---|---|---|---|---|---|
| VIDEO A | a | 32.08 | 33.96 | 36.49 | 39.94 |
| | b | 32.54 | 34.37 | 37.01 | 40.49 |
| VIDEO B | a | 38.12 | 40.56 | 43.91 | 47.89 |
| | b | 38.97 | 41.12 | 44.41 | 48.22 |
| VIDEO C | a | 30.63 | 31.83 | 34.22 | 36.82 |
| | b | 30.85 | 32.13 | 34.47 | 37.05 |

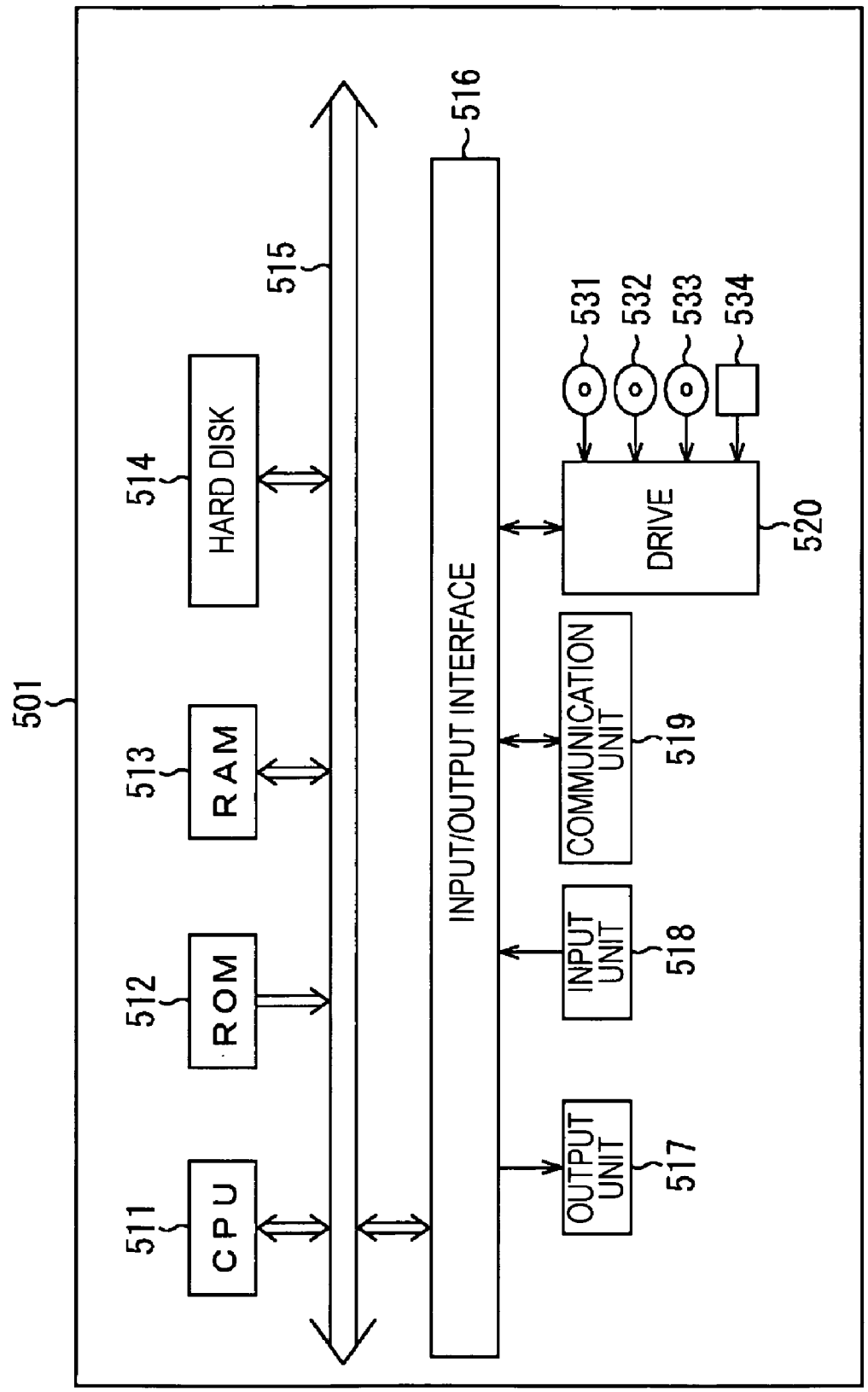

ENCODING DEVICE AND METHOD, DECODING DEVICE AND METHOD, AND PROGRAM

CROSS REFERENCES TO RELATED APPLICATIONS

The present invention contains subject matter related to Japanese Patent Application JP 2005-128037 filed in the Japanese Patent Office on Apr. 26, 2005, the entire contents of which are incorporated herein by reference.

BACKGROUND OF THE INVENTION

1. Field of the Invention

The present invention relates to an encoding device, an encoding method, a decoding device, a decoding method, and a program and particularly relates to an encoding device, an encoding method, a decoding device, a decoding method, and a program that are adapted to perform intra-frame encoding using wavelet transformation with efficiency.

2. Description of the Related Art

Codecs using wavelet transformation such as the Joint Photographic Experts Group (JPEG) 2000 standard receive attention, as video-compression systems.

SUMMARY OF THE INVENTION

However, since intra-frame encoding is performed under the JPEG 2000 standard, the encoding efficiency thereof is lower than in the case where inter-frame encoding is performed under the Moving Picture Experts Group (MPEG) 4 standard.

Accordingly, the present invention allows for performing the intra-frame encoding using the wavelet transformation with efficiency.

An encoding device according to an embodiment of the present invention includes a generation unit configured to generate a composite image for every n temporally consecutive frames and an encoding unit configured to encode the composite image.

The encoding device further includes a storage unit configured to store data on the composite image encoded by the encoding unit, wherein the storage unit stores information about the structure of the composite image in addition to the encoded data.

The generation unit can generate a symmetrical-composite image including one frame of the n frames and a predetermined frame which has a first coordinate system obtained by converting a second coordinate system of another frame of the n frames so that the first coordinate system and a third coordinate system of the one frame are symmetrical.

An encoding method according to another embodiment of the present invention includes the steps of generating a composite image for every n temporally consecutive frames, and encoding the composite image.

A first program according to another embodiment of the present invention includes the steps of generating a composite image for every n temporally consecutive frames, and encoding the composite image.

In the case of the above-described encoding device, encoding method, and first program, the composite image is generated for every n temporally consecutive frames and the generated composite image is encoded.

A decoding device according to another embodiment of the present invention includes a decoding unit configured to decode encoded data, a decomposition unit configured to decompose image data on a composite image into frames, the composite-image data being obtained through the decoding, and an output unit configured to output the frames decomposed by the decomposition unit.

The encoded data is obtained by encoding a symmetrical-composite image including one frame of the n temporally consecutive frames and a predetermined frame which has a first coordinate system obtained by converting a second coordinate system of another frame of the n frames so that the first coordinate system and a third coordinate system of the one frame are symmetrical by performing the intra-frame encoding using the wavelet transformation. Further, the decoding device may further include a conversion unit configured to restore a coordinate system of each of the n frames decomposed by the decomposition unit to the original state of the coordinate system.

A decoding method according to another embodiment of the present invention includes the steps of decoding encoded data, decomposing image data on a composite image into frames, the composite-image data being obtained through the decoding, and outputting the frames decomposed at the decomposition step.

A second program according to another embodiment of the present invention includes the steps of decoding encoded data, decomposing image data on the composite image into frames, the composite-image data being obtained through the decoding, and outputting the frames decomposed at the decomposition step.

In the case of the above-described decoding device, decoding method, and second program, the encoded data is decoded, data on a composite image obtained through the decoding is decomposed into frames, and the decomposed frames are output.

The present invention allows for performing the intra-frame encoding using the wavelet transformation with efficiency.

BRIEF DESCRIPTION OF THE DRAWINGS

FIG. 19 is another diagram illustrating the encoding processing;

FIG. 24 is a block diagram illustrating an example configuration of a personal computer.

DESCRIPTION OF THE PREFERRED EMBODIMENTS

Hereinafter, embodiments of the present invention will be described with reference to the attached drawings. The embodiment only shows the best case adapted to achieve the present invention. Therefore, the present invention is not limited to the following embodiment.

Figure 1:
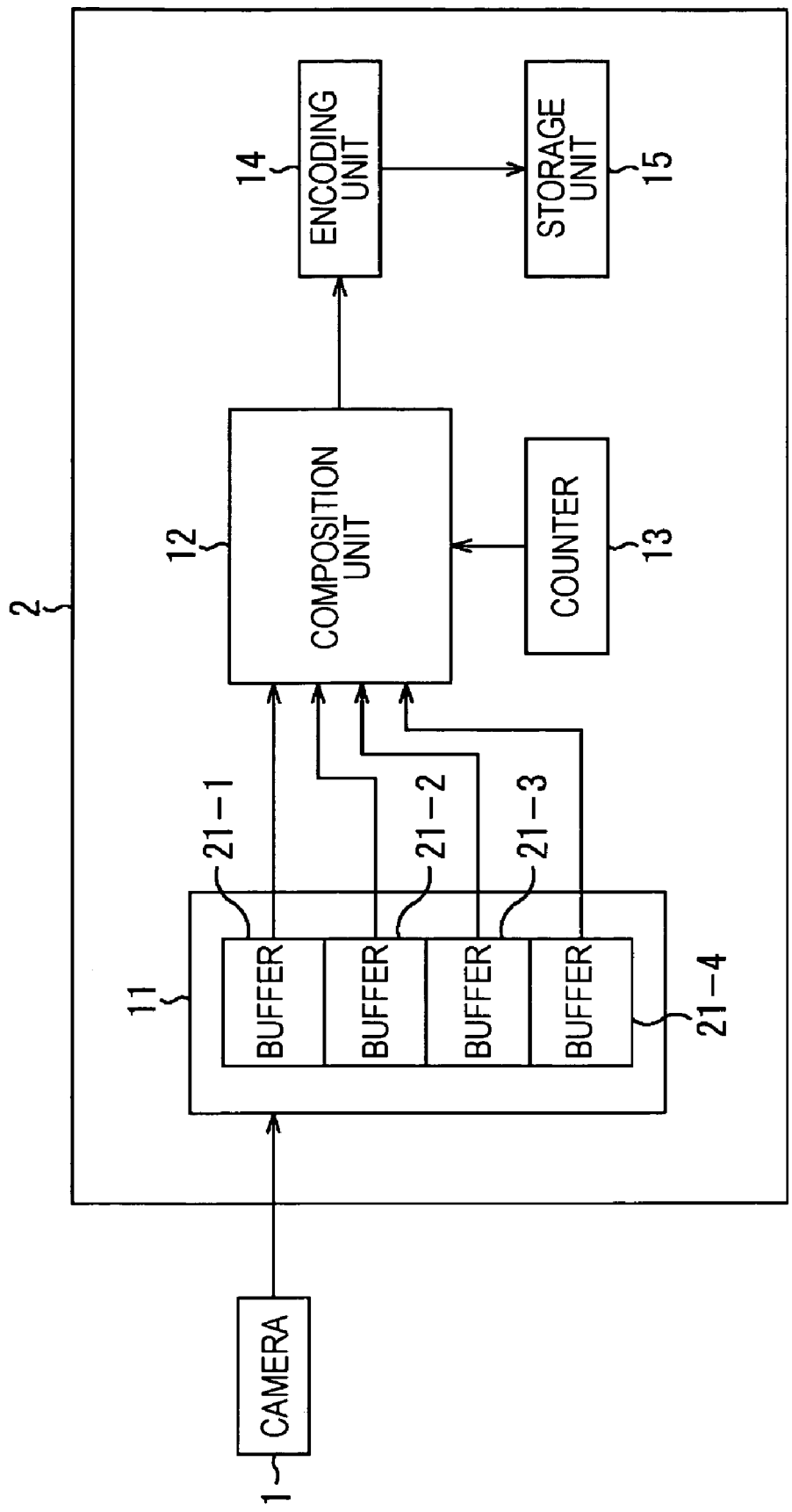
FIG. 1 is a block diagram showing an example configuration of an encoding device according to an embodiment of the present invention.

FIG. 1 shows an example configuration of an encoding device 2 according to an embodiment of the present invention. The encoding device 2 performs intra-frame encoding using the wavelet transformation for videos picked up by a video camera 1. However, the encoding device 2 does not encode the videos for each frame. Namely, the encoding device 2 combines consecutive frames (four frames in this embodiment) with one another, so as to generate a single large image (hereinafter referred to as a composite image W), and encodes the composite image W. Here, a generation unit described in Claims can be achieved by using a composition unit 12 shown in FIG. 1, for example. Further, an encoding unit and a storage unit described in Claims can be achieved by using an encoding unit 14 and a storage unit 15 that are shown in FIG. 1, respectively, for example.

Figure 2:
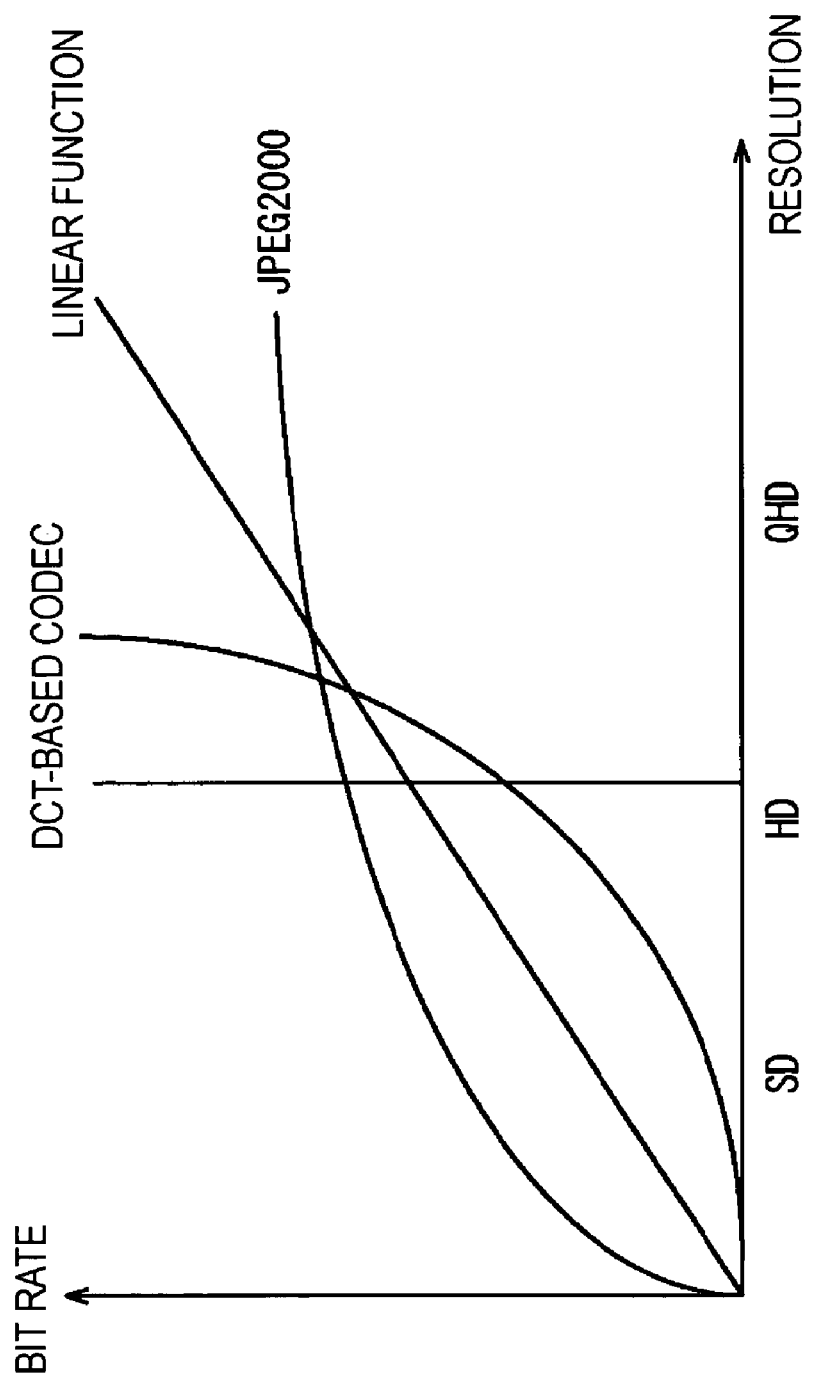
FIG. 2 is a diagram illustrating encoding processing.

FIG. 2 shows the data amount (bit rate) used for obtaining predetermined image quality represented by the peak signal-to-noise ratio (PSNR), for example, according to the resolution (image size) of an image subjected to each of encoding performed under the JPEG 2000 standard (encoding using the wavelet transformation) and encoding performed by using discrete cosine transformation (DCT).

The PSNR denotes the ratio between an image signal and a noise that had gotten into data and is expressed in terms of decibel (dB) scale. The lower the PSNR value, the more noise exists in the data.

Figure 3:
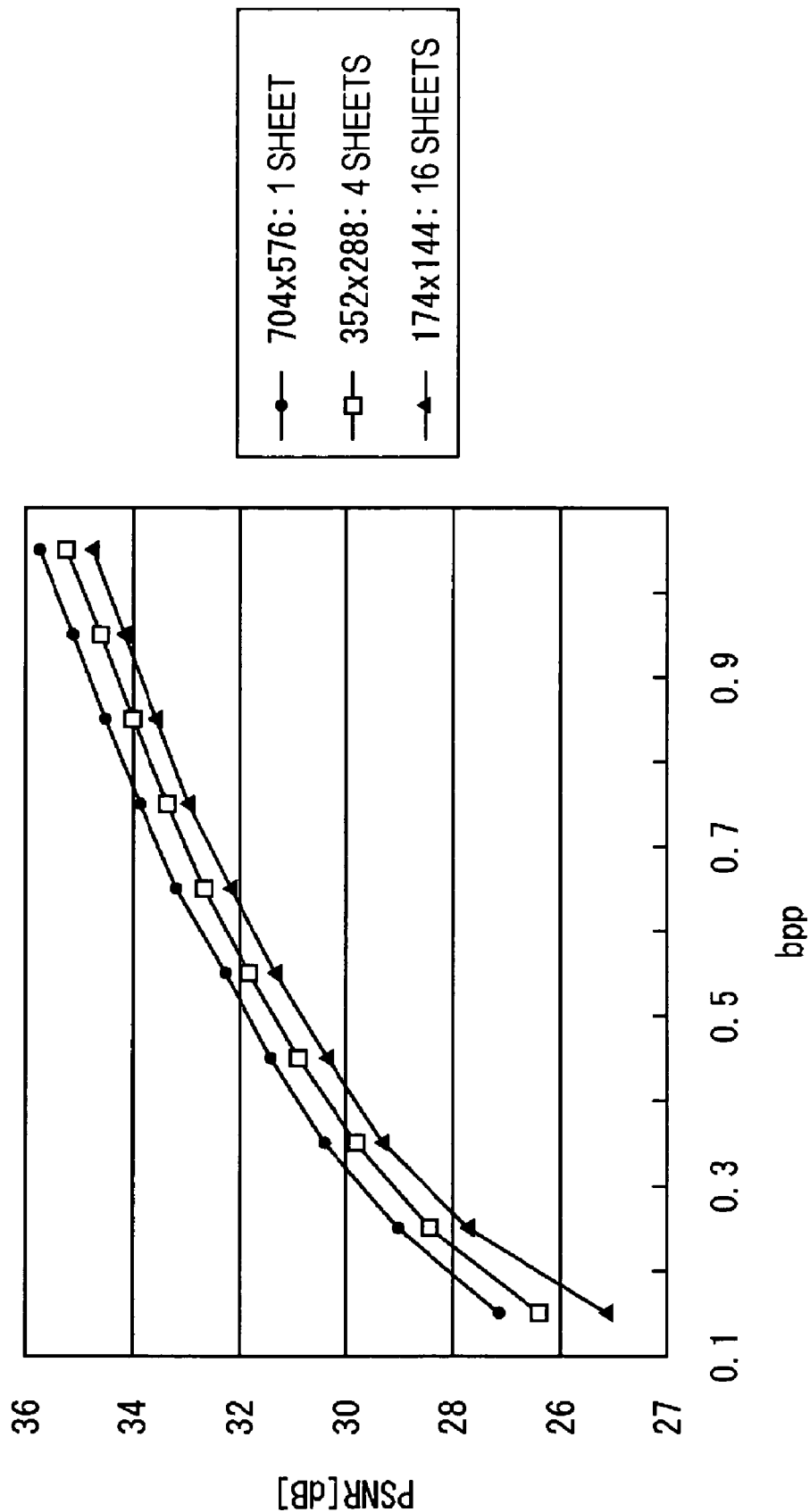
FIG. 3 is another diagram illustrating the encoding processing.

FIG. 3 shows the difference between the bit rates adapted to obtain the predetermined image quality of three images when the encoding using the wavelet transformation is performed. The three images include a first image with the 704×576-size, a second image with the 352×288-size, where the second image is obtained by dividing the first image into four parts, and a third image with the 176×144-size, where the third image is obtained by diving the first image into sixteen parts.

FIG. 2 shows that the larger the image size, the less the increase in the bit rate becomes significant, in the case where encoding is performed under the JPEG 2000 standard. Further, after the resolution value exceeds a predetermined value, the bit rate used for performing encoding under the JPEG 2000 standard becomes lower than that obtained by performing the DCT-based encoding and the linear function. Further, FIG. 3 shows that the larger the image size, the less the bit rate used for obtaining the same image quality becomes significant. Thus, when images of almost the same kind are encoded, the larger the image size, the higher the encoding efficiency becomes.

Namely, according to the embodiment of the present invention, data encoding is not performed in frames. Namely, a single large image (the composite image W) is generated by using a plurality of frames (four frames in the case of FIG. 1), and the composite image W is encoded so that the encoding efficiency increases.

Returning to FIG. 1, the configuration of the encoding device 2 will be described.

Data on the videos picked up by the video camera 1 is transmitted to an input unit 11 of the encoding device 2. The higher the frame rate of the videos picked up by the video camera 1, the stronger the resemblance between images between frames becomes. Therefore, the above-described composite image W can be encoded with increased encoding efficiency.

The input unit 11 includes N (N=4 holds in this embodiment) buffers 21-1, 21-2, 21-3, and 21-4. Hereinafter, if there is no need to identify the buffers 21-1 to 21-4 separately, the buffers 21-1 to 21-4 are collectively referred to as a buffer 21, which also applies in other embodiments. The input unit 11 stores frames generating the transmitted videos in the buffer 21 in sequence and transmits the frames to the composition unit 12, as required.

The composition unit 12 reads the frames stored in the buffers 21-1 to 21-4 and generates the composite image W by using the read frames.

For example, the composition unit 12 reads the first frame shown in FIG. 4A (hereinafter referred to as a frame P1) of the frames stored in the buffer 21 from the buffer 21-1 and arranges the frame P1 on an upper-left part, as shown in FIG. 4B. Further, the composition unit 12 reads the frame following the frame P1 (hereinafter referred to as a frame P2) from the buffer 21-2 and arranges the frame P2 on an upper-right part, reads the frame following the frame P2 (hereinafter referred to as a frame P3) from the buffer 21-3 and arranges the frame P3 on a lower-left part, and reads the frame following the frame P3 (hereinafter referred to as a frame P4) from the buffer 21-4 and arranges the frame P4 on a lower-right part, so as to generate the composite image W.

Figure 5:
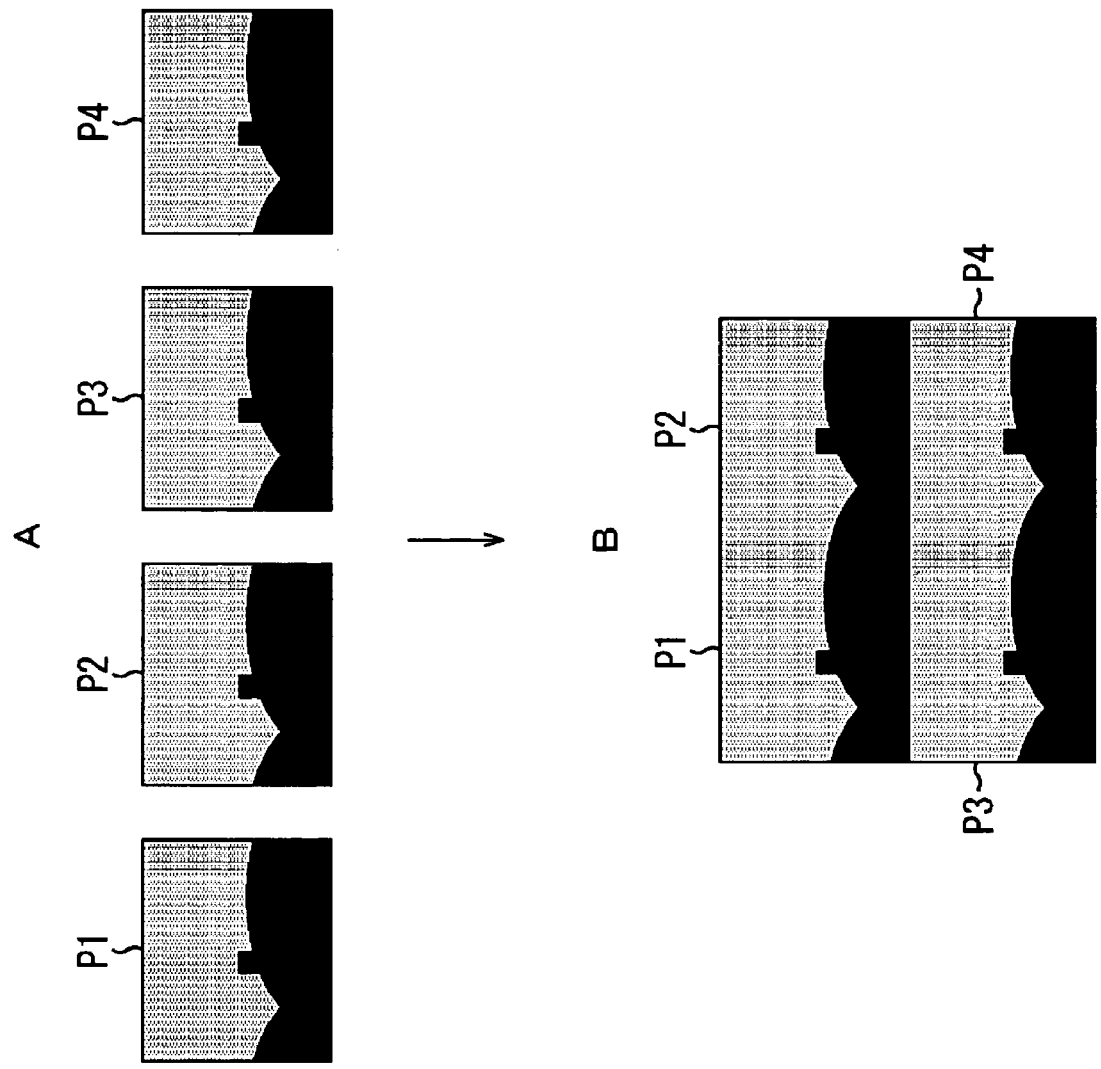
FIG. 5 is another diagram illustrating the encoding processing.
Figure 6:
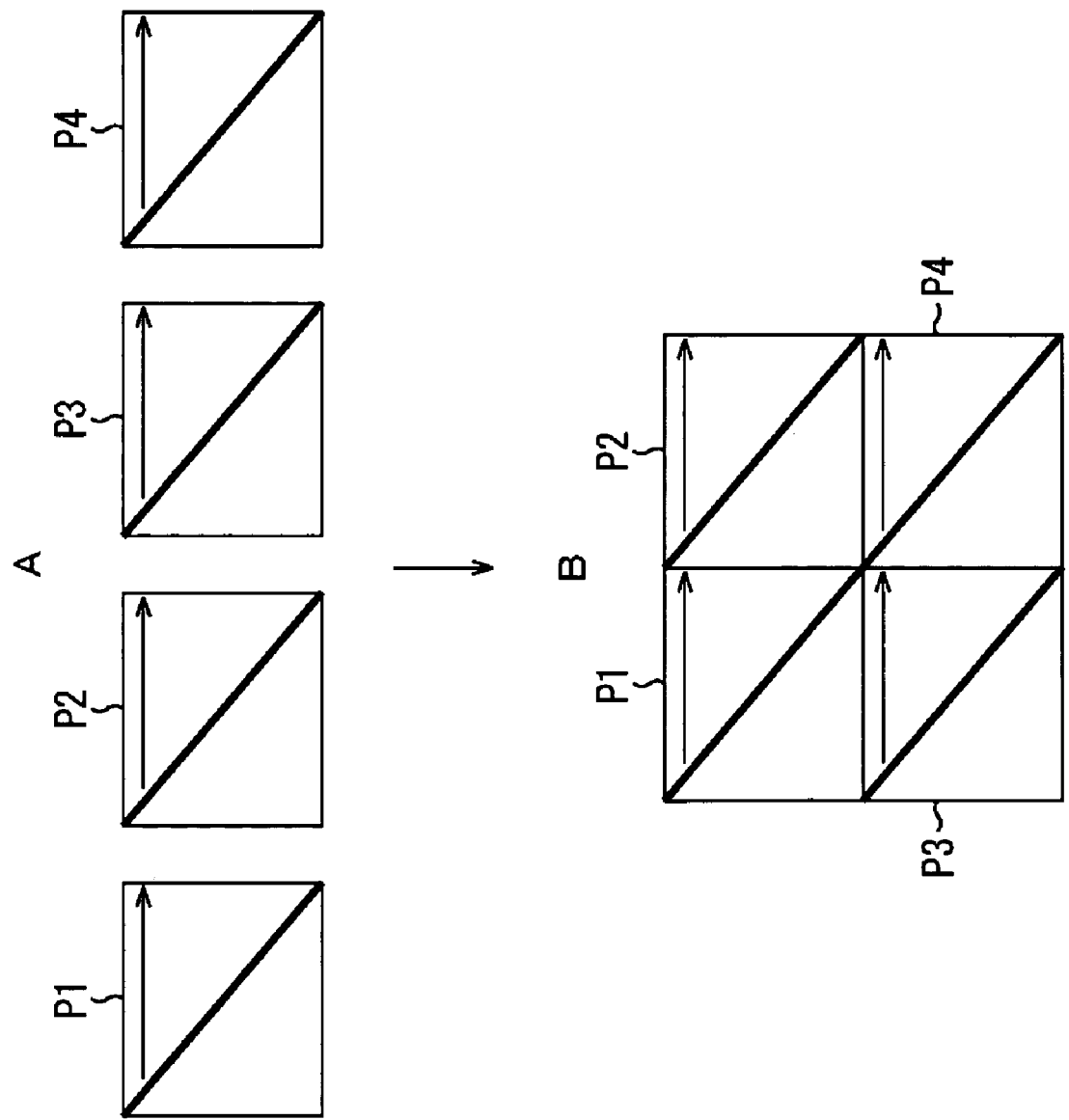
FIG. 6 is another diagram illustrating the encoding processing.

For example, the frames P1 to P4 shown in FIGS. 5A and 6A generate the composite image W, as shown in FIGS. 5B and 6B.

Returning to FIG. 1, the composition unit 12 transmits information relating to the generated composite image W and the generation method (described later) to an encoding unit 14.

Here, the number of frames generating the composite image W (hereinafter referred to as generation frames) is determined according to the value of a counter 13. A user can set the counter value by operating an operation unit (not shown).

Every time the composition unit 12 transmits the composite image W, the encoding unit 14 performs intra-frame encoding using the wavelet transformation for the composite image W. Further, the encoding unit 14 stores data on the encoded composite image W in the storage unit 15, as a single file, according to a format shown in FIG. 7.

Figure 7:
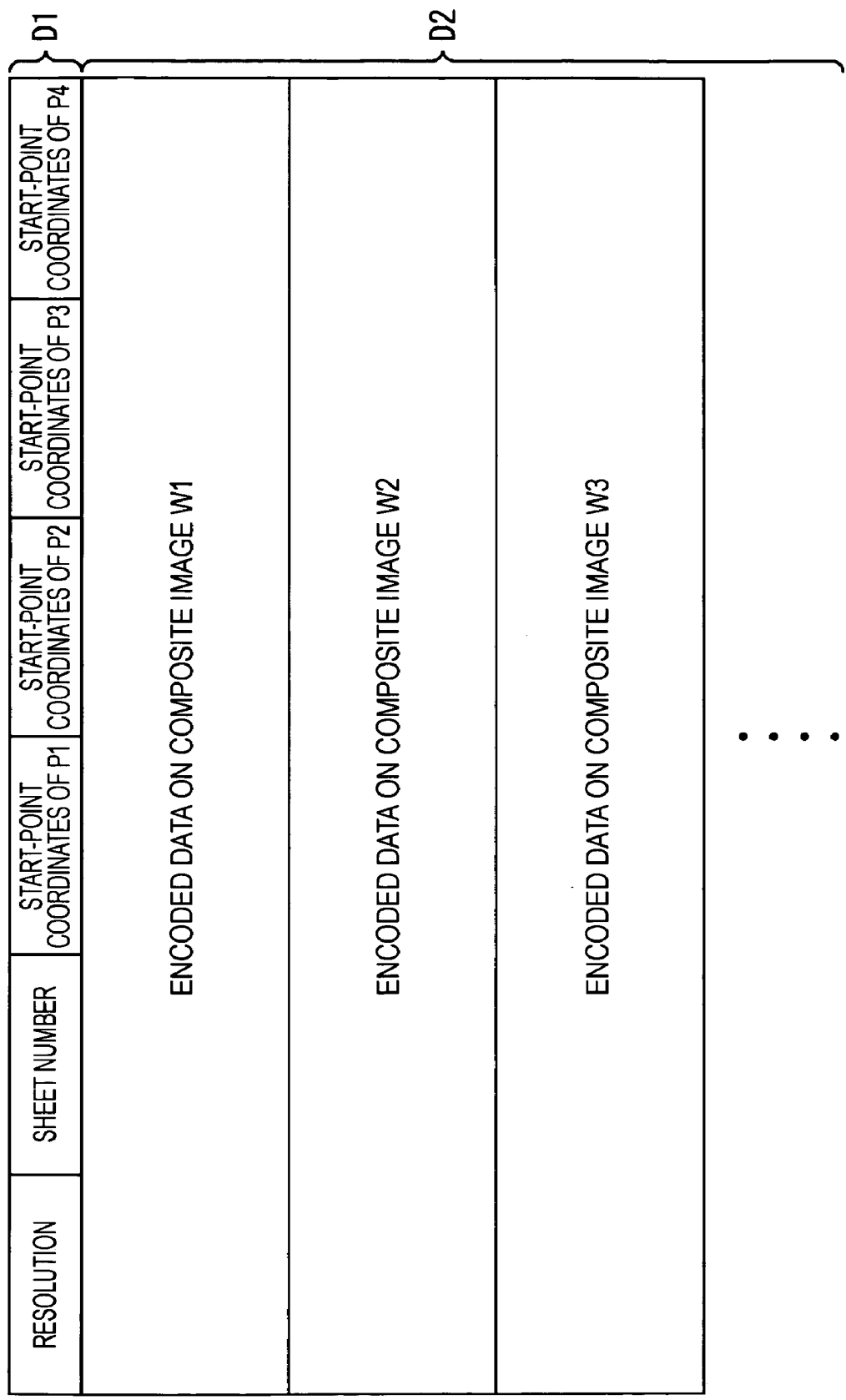
FIG. 7 is a diagram showing an example format of encoded data.
Figure 8:
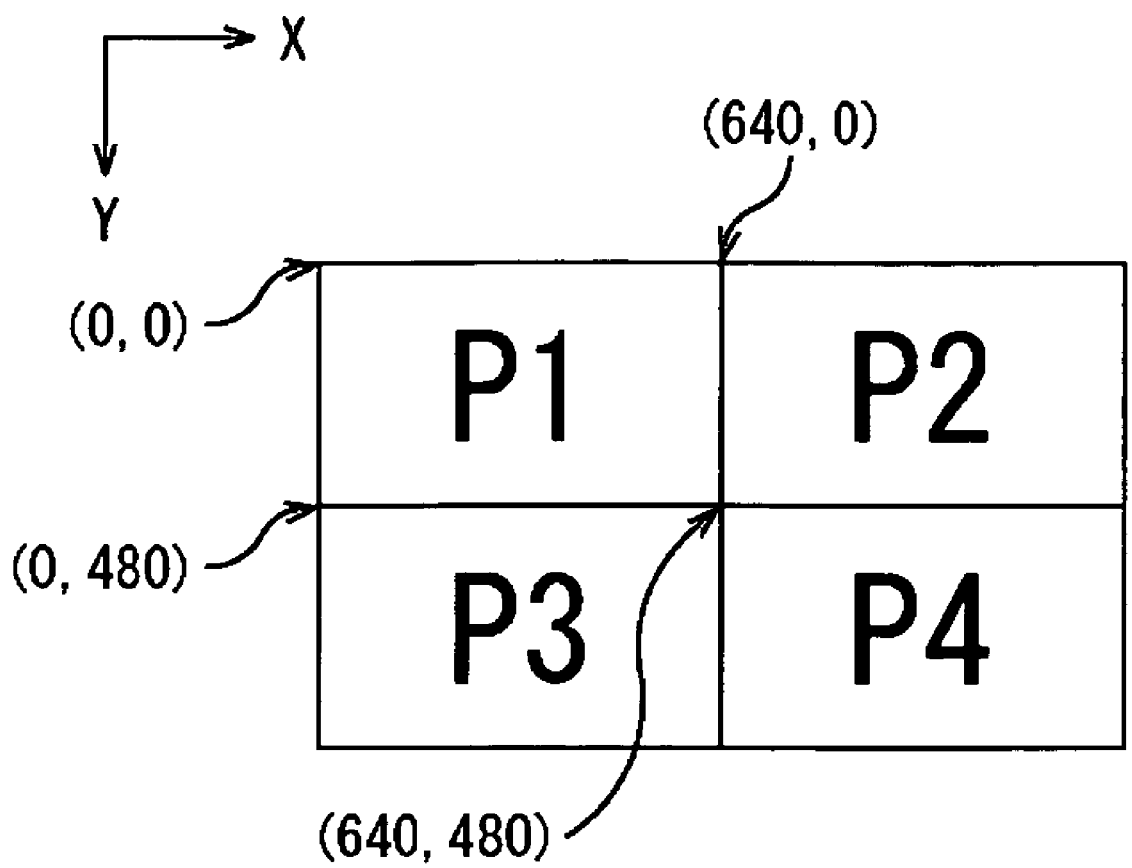
FIG. 8 is a diagram illustrating composite information.

The file format shown in FIG. 7 includes a storing unit D1 which stores data items about the resolution of a recorded video (image size), the number of generation frames generating the composite image W, and start-point coordinates on the composite image W generated by the generation frames. The above-described data items are collectively referred to as composite data.

For example, when the image size of a single frame of the recorded video is represented by the resolution of 640×480 and the composite image W includes four frames, the storing unit D1 stores information indicating that the generation frame has the resolution of 640×480, information indicating that there are four generation frames, and information indicating that the start-point coordinates of the frame P1 are shown as (0, 0), the start-point coordinates of the frame P2 are shown as (640, 0), the start-point coordinates of the frame P3 are shown as (0, 480), and the start-point coordinates of the frame P4 are shown as (640, 480).

The file format shown in FIG. 7 also includes a storing unit D2 configured to store encoded data on the composite image W.

Next, operations of the encoding unit 2 will be described with reference to a flowchart shown in FIG. 9.

At step S1, the composition unit 12 of the encoding device 2 acquires the value of the counter 13 and determines the number N (N=4 holds in this embodiment) of the generation frames generating the composite image W. Further, the composition unit 12 determines the resolution of the recorded video and the start-point coordinates of the generation frames, and transmits the determination information to the encoding unit 14.

Next, at step S2, the composition unit 12 waits until N frames (four frames in this embodiment) are stored in the buffer 21. When the four frames (consecutive four frames) are stored in the buffer 21, the flow proceeds to step S3.

Figure 4:
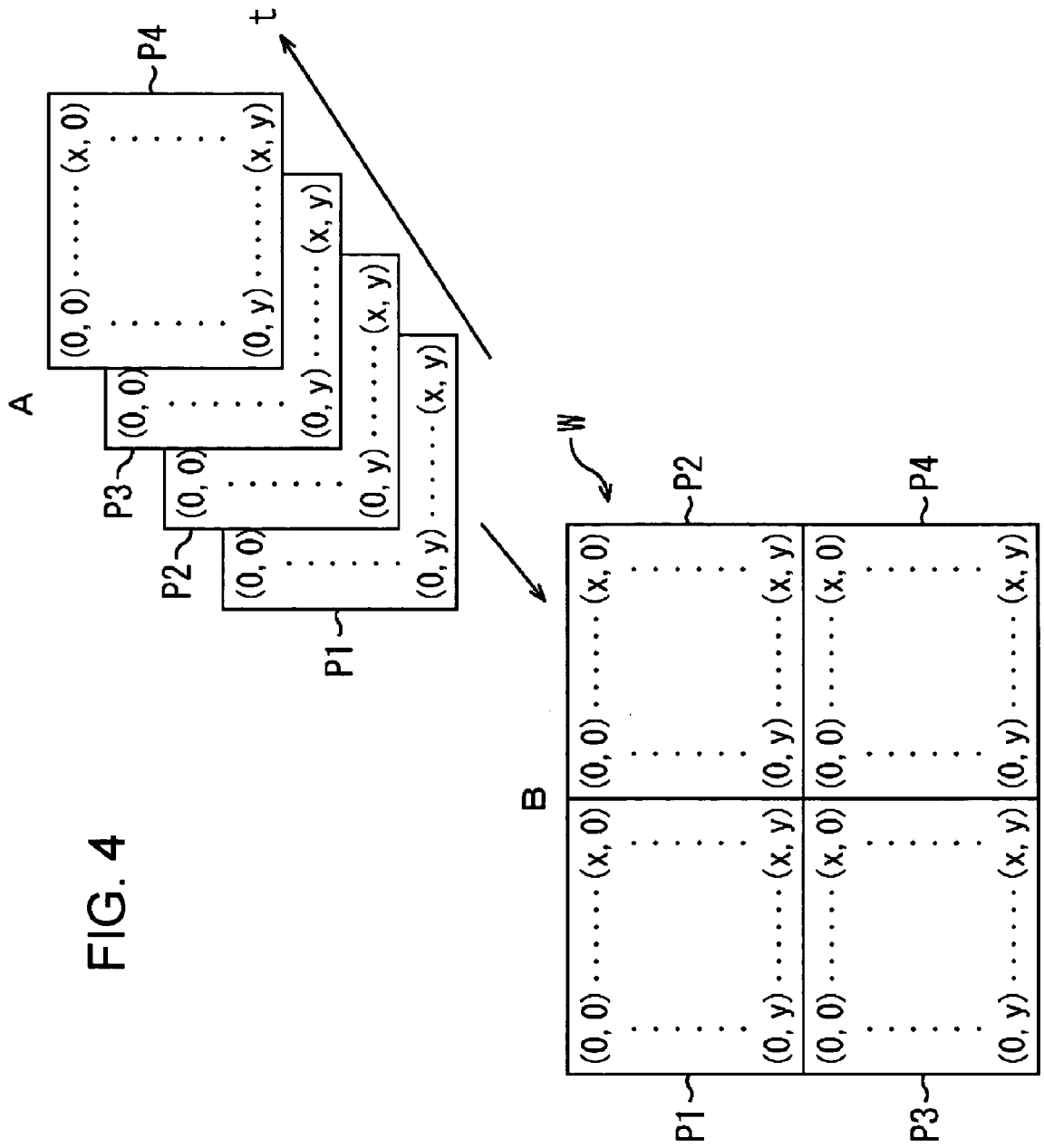
FIG. 4 is another diagram illustrating the encoding processing.

At step S3, the composition unit 12 reads the frames stored in the buffer 21, respectively. Then, as shown in FIG. 4, the composition unit 12 arranges the frame P1 read from the buffer 21-1 on the upper-left part, the frame P2 read from the buffer 21-2 on the upper-right part, the frame P3 read from the buffer 21-3 on the lower-left part, and the frame P4 read from the buffer 21-4 on the lower-right part, respectively, so as to generate the composite image W. The composition unit 12 transmits the generated composite image W to the encoding unit 14.

At step S4, the encoding unit 14 performs the intra-frame encoding by using the wavelet transformation for the composite image W transmitted from the composition unit 12.

At step S5, the encoding unit 14 stores the encoded data obtained by performing the encoding, at step S4, into the storing unit D2 shown in FIG. 7 of the file format. Here, when storing encoded data on the first composite image W, the encoding unit 14 stores the composite information transmitted from the composition unit 12 (step S1) in the storing unit D1.

At step S6, the composition unit 12 determines whether or not the input unit 11 finished inputting videos, namely, whether or not recording the videos picked up by the video camera 1 is finished. If the composition unit 12 determines that the recording is not finished, the flow then returns to step S2 so that the processing from then on is performed again in the above-described manner.

If it is determined that the video recording is finished, at step S6, the encoding is terminated.

Figure 10:
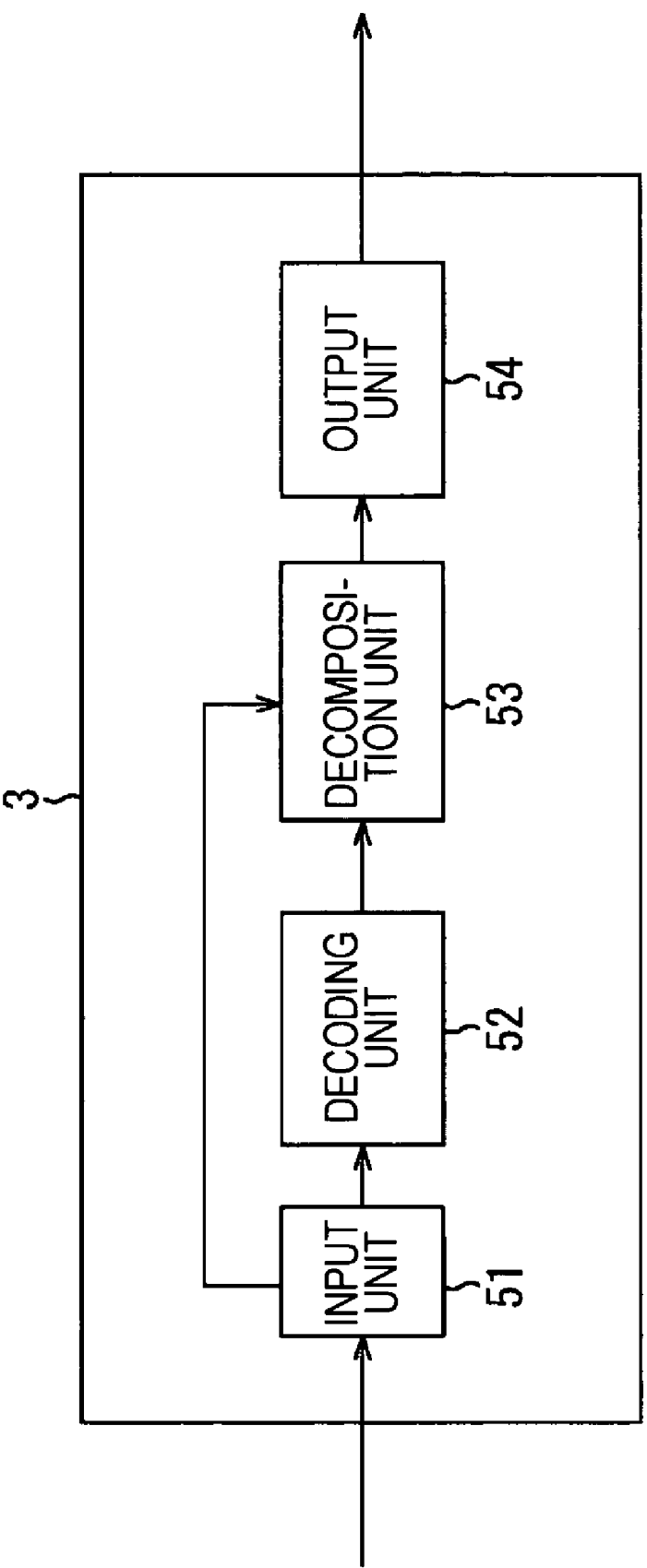
FIG. 10 is a block diagram illustrating an example configuration of a decoding device according to another embodiment of the present invention.

FIG. 10 shows an example configuration of a decoding device 3 configured to decode data on the video encoded by the encoding device 2 shown in FIG. 1. A decoding unit described in Claims can be achieved by using a decoding unit 52 shown in FIG. 10, for example. Further, a decomposition unit and an output unit described in Claims can be achieved by using a decomposition unit 53 and an output unit 54 that are shown in FIG. 10, respectively, for example.

The encoding device 2 transmits file data stored according to the file format shown in FIG. 7 to an input unit 51 of the decoding device 3.

The input unit 51 reads and transmits the composite information stored in the storing unit D1 of the file data to the decomposition unit 53. Further, the input unit 51 transmits the encoded data on the composite image W to the decoding unit 52, the encoded data being stored in the storing unit D2 of the file data.

The decoding unit 52 decodes the encoded data transmitted from the input unit 51 so that image data on the composite image W is obtained, and transmits the image data to the decomposition unit 53.

The decomposition unit 53 decomposes the image data transmitted from the decoding unit 52 into the generation frames according to the composite information transmitted from the input unit 51 and transmits the decomposed image data to an output unit 54.

The output unit 54 transmits the image data transmitted from the decomposition unit 53 in frames to a display unit (not shown), for example, so that the display unit produces an image of the image data.

Next, operations of the decoding device 3 will be described with reference to a flowchart shown in FIG. 11.

At step S11, the input unit 51 of the decoding device 3 extracts and transmits the composite information stored in the storing unit D1 (FIG. 7) of the input file data to the decomposition unit 53. Further, the input unit 51 extracts and transmits the encoded data on the composite image W to the decoding unit 52, the encoded data being stored in the storing unit D2 of the file data.

At step S12, the decoding unit 52 decodes the encoded data transmitted from the input unit 51. The decoding unit 52 transmits the image data obtained by performing the decoding to the decomposition unit 53.

At step S13, the decomposition unit 53 decomposes the image data transmitted from the decoding unit 52 in frames according to the composite information transmitted from the input unit 51 and transmits the decomposed image data to the output unit 54.

For example, upon receiving the image data on the composite image W shown in FIG. 4B, the image data being transmitted from the decoding unit 52, the decomposition unit 53 decomposes the image data into frames P1 to P4 (FIG. 4A) according to the start-point coordinates and resolution of each of the generation frames of the composite information, and transmits the frames P1, P2, P3, and P4 to the output unit 54 in that order.

At step S14, the output unit 54 transmits the frames P1 to P4 transmitted from the decomposition unit 53 to the display unit in the order of display, for example.

At step S15, the decomposition unit 53 determines whether or not the image data on the entire composite images W transmitted from the decoding unit 52 is decomposed. If the decomposition unit 53 determines that the image data on the entire composite images W is not yet decomposed, the flow then returns to step S13 so that the image data on the next composite image W is decomposed. After that, the flow advances to step S14 so that processing from then on is performed in the above-described manner.

If it is determined that the image data on the entire composite images W is decomposed, at step S15, the decoding is terminated.

Figure 12:
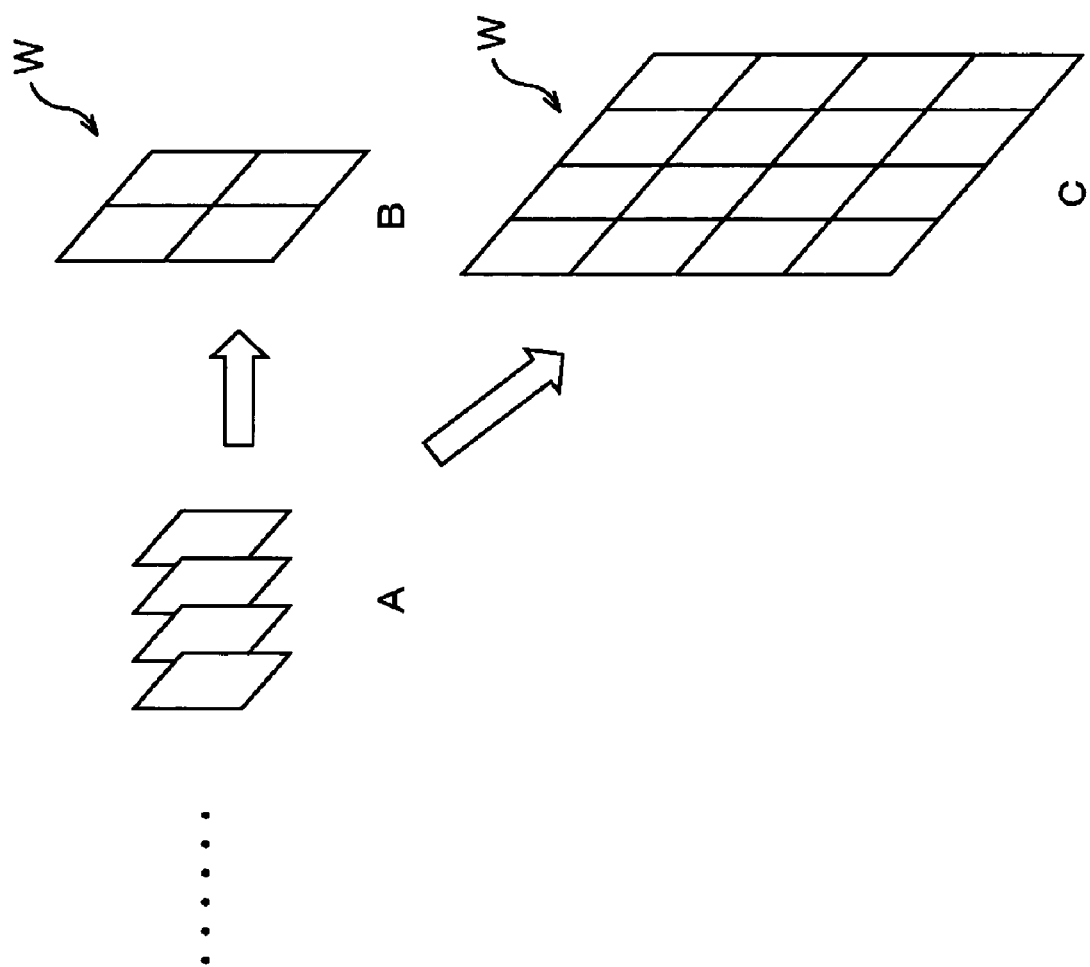
FIG. 12 is another diagram illustrating the encoding processing.

In the above-described embodiment, the composite image W includes four frames, as shown in FIG. 12B. However, the composite image W may include sixteen frames, as shown in FIG. 12C, or a different number of frames (three, seventeen, or eighteen frames, for example).

Figure 13:
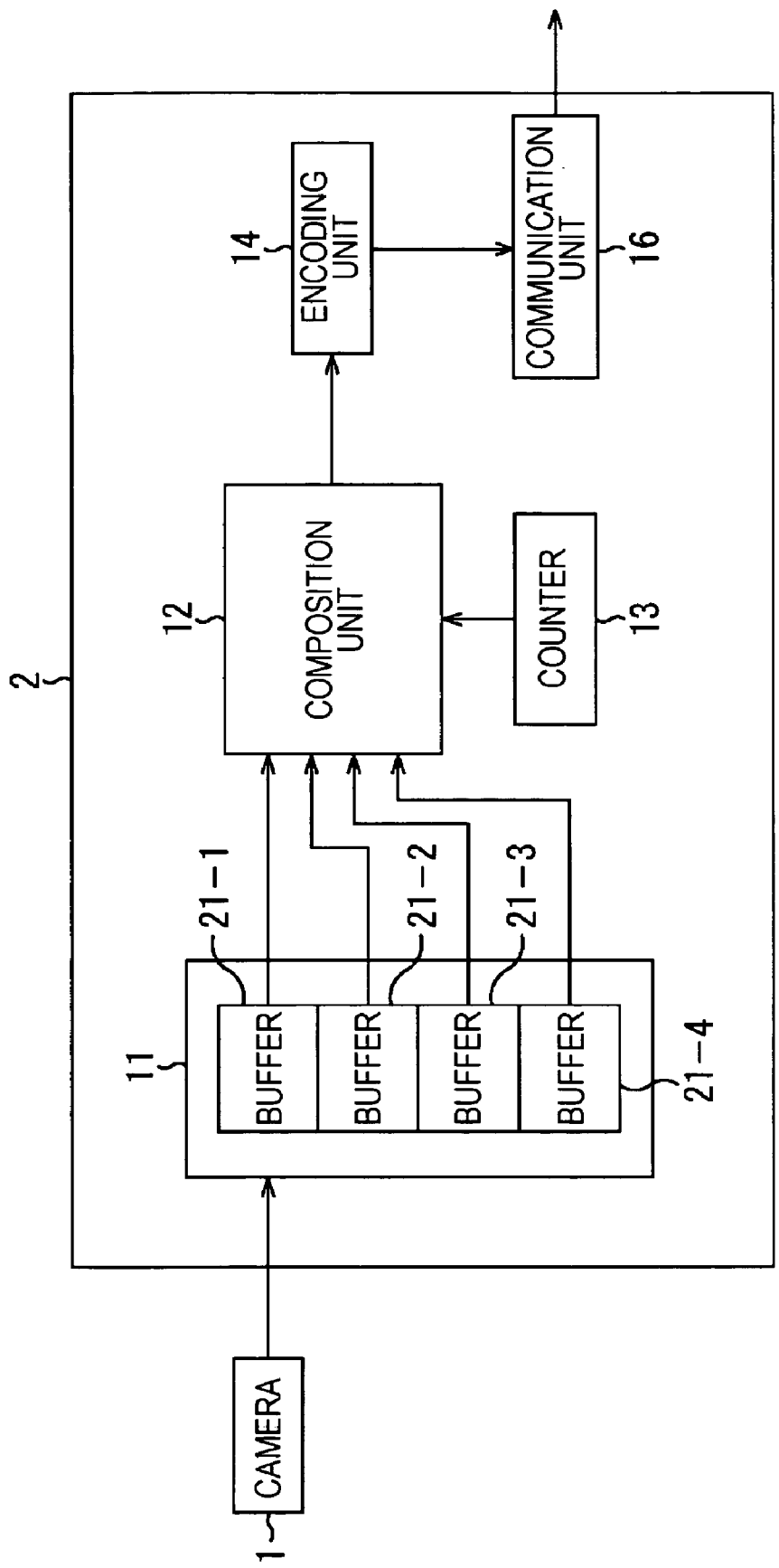
FIG. 13 is a block diagram illustrating an example configuration of another encoding device according another embodiment of the present invention.
Figure 14:
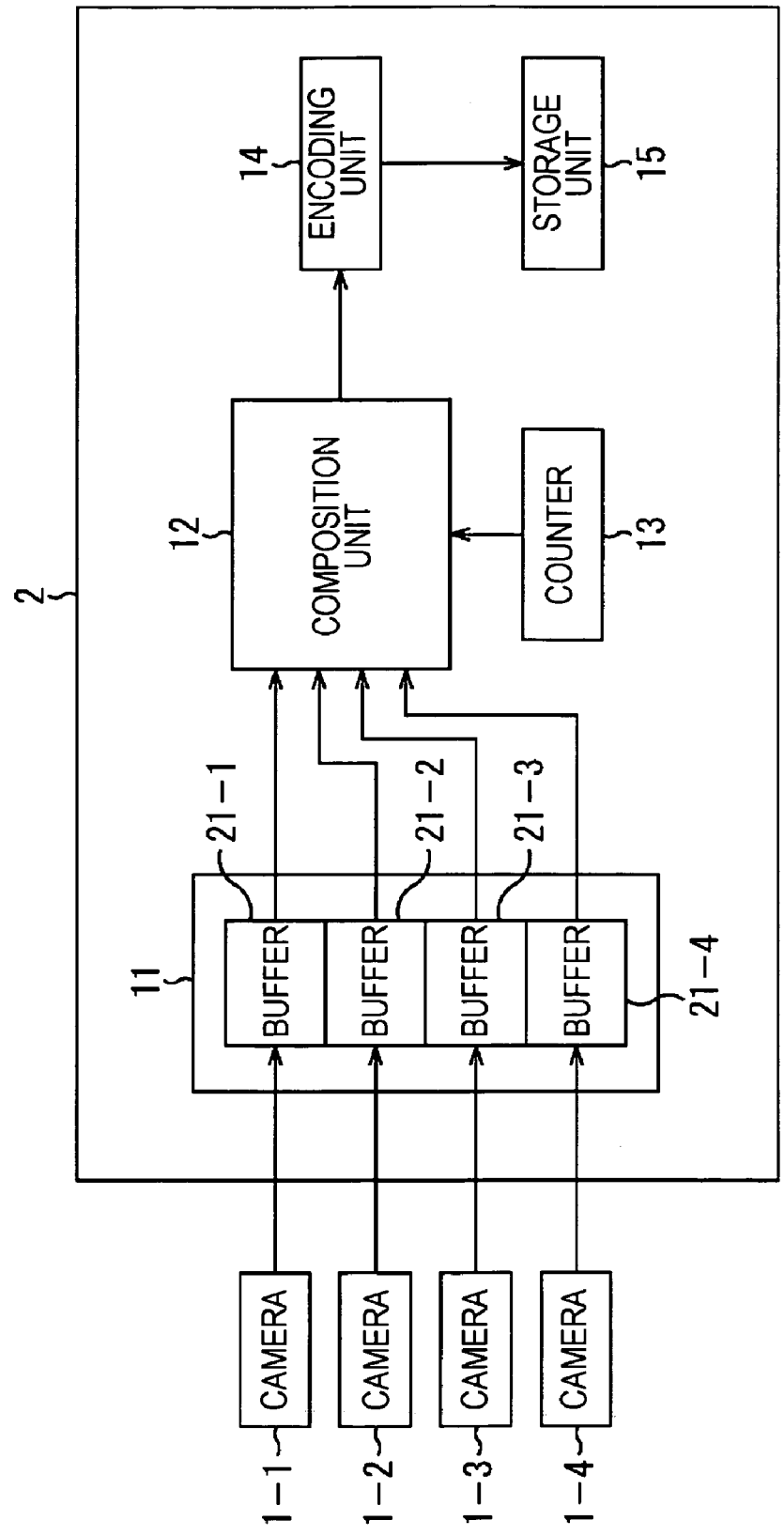
FIG. 14 is a block diagram illustrating an example configuration of another encoding device according another embodiment of the present invention.

In the case of FIG. 1, the encoded data is stored in the storage unit 15. However, a communication unit 16 may be provided, as shown in FIG. 13, so as to transmit the encoded data by using the communication unit 16 via a network (not shown).

Further, in the case of FIG. 1, the video picked up by the single video camera 1 is encoded. However, a plurality of video cameras (four video cameras in this embodiment) 1-1, 1-2, 1-3, and 1-4 which picks up the images of a subject at the same time may be provided. Subsequently, videos are obtained and encoded. In that case, the composite image W includes frames that are transmitted from the video cameras 1-1 to 1-4 and that correspond to one another (the frames including the images picked up at the same time).

Figure 15:
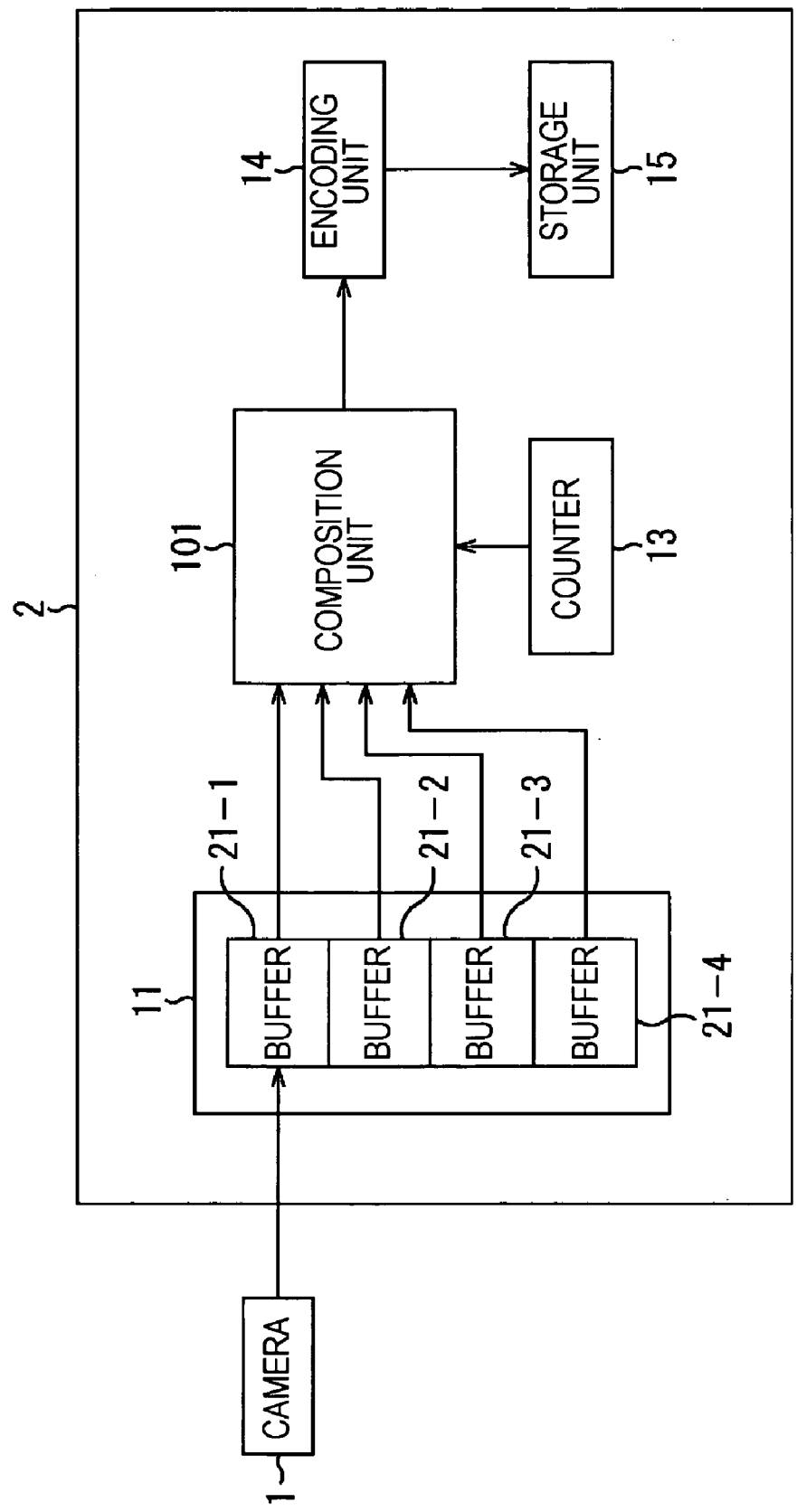
FIG. 15 is a block diagram illustrating an example configuration of another encoding device according another embodiment of the present invention.

FIG. 15 shows another example configuration of the encoding device 2. The encoding device 2 shown in FIG. 15 includes a composition unit 101 in place of the composition unit 12 provided in the encoding device 2 shown in FIG. 1.

Figure 16:
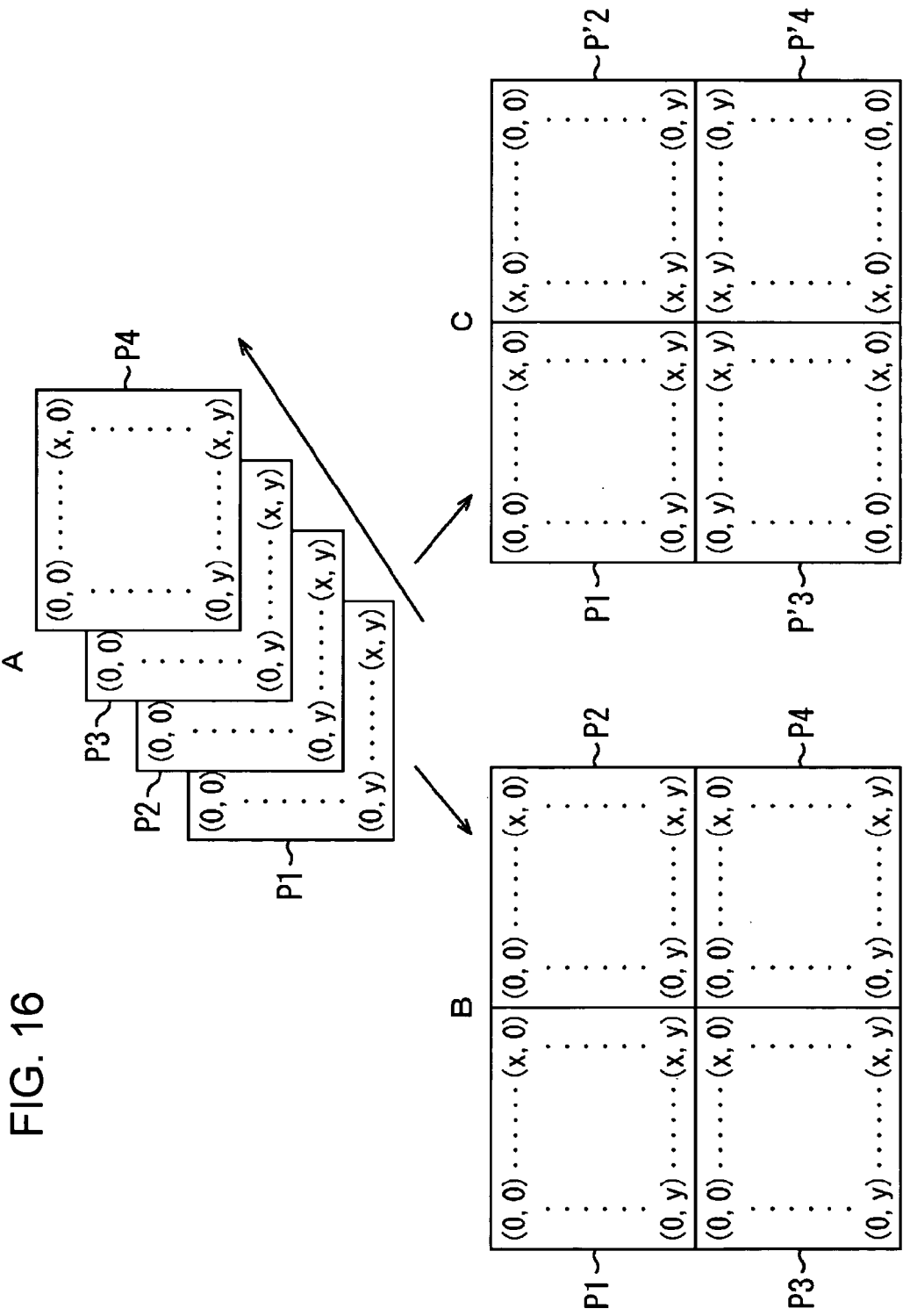
FIG. 16 is another diagram illustrating the encoding processing.

In the encoding device 2 shown in FIG. 1, for example, every four frames (FIG. 16A) transmitted thereto are arranged in their original formats at predetermined positions, so as to generate the composite image W, as shown in FIG. 16B. However, as shown in FIG. 16C, the frame P1 is arranged on the same upper-left part as in the case of FIG. 1, a frame P2' obtained by converting the frame P1 into a coordinate system so that the x coordinate thereof and that of the frame P1 are line-symmetrical is arranged in place of the frame P2, a frame P3' obtained by converting the frame P1 into a coordinate system so that the y coordinate thereof and that of the frame P1 are line-symmetrical is arranged in place of the frame P3, and a frame P4' obtained by converting the frame P1 into a coordinate system so that the coordinates (x, y) thereof and those of the frame P1 are point-symmetrical is arranged in place of the frame P4. The frames P1, P2', P3', and P4' are arranged on the upper-left part, the upper-right part, the lower-left part, and the lower-right part, so as to generate the composite image W. Hereinafter, the composite image W generated, as shown in FIG. 16B, is referred to as a simple-composite image W and the composite image W generated, as shown in FIG. 16C, is referred to as a symmetrical-composite image W.

Figure 17:
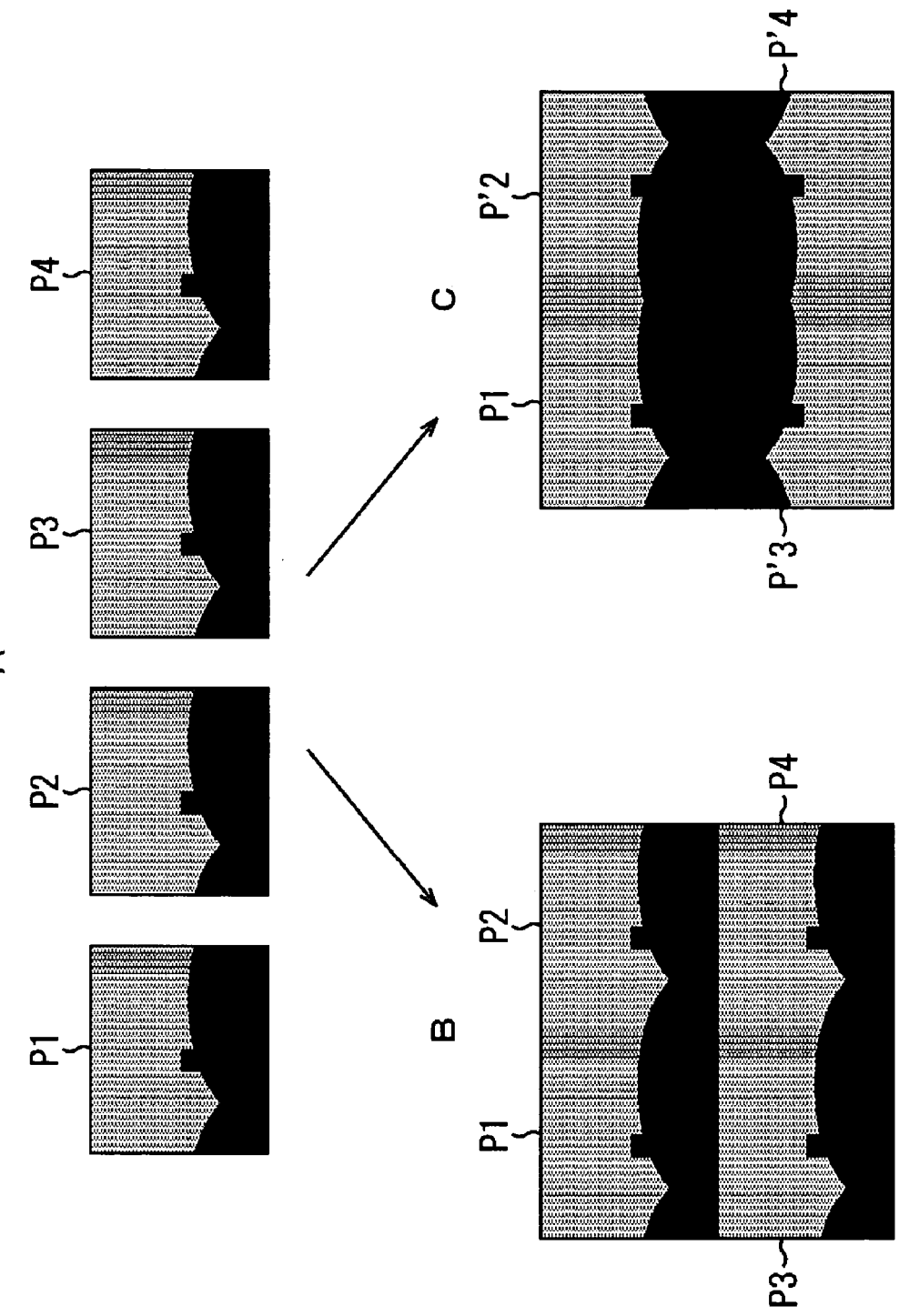
FIG. 17 is another diagram illustrating the encoding processing.
Figure 18:
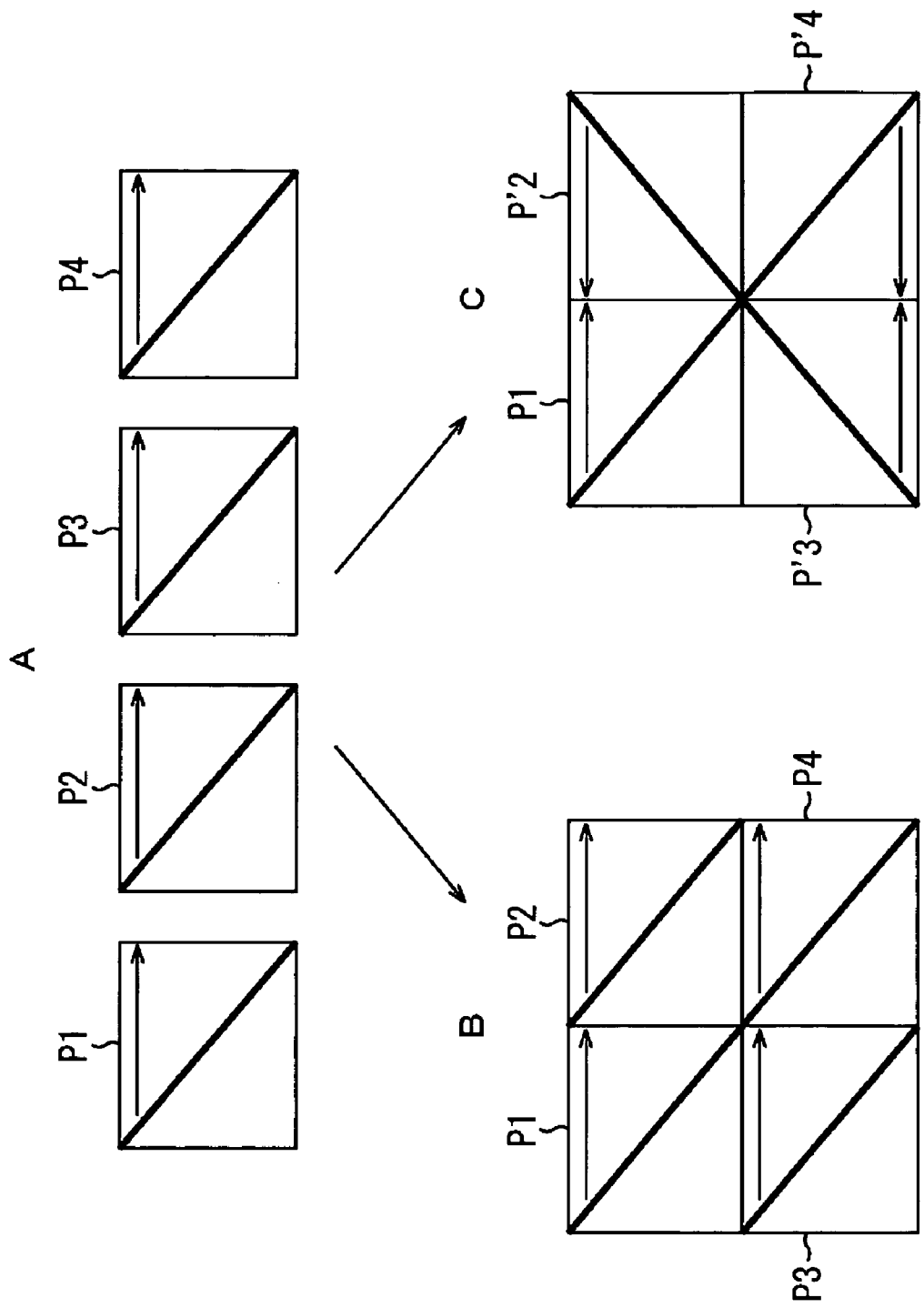
FIG. 18 is another diagram illustrating the encoding processing.

For example, the simple-composite images W shown in FIGS. 17B and 18B include the frames P1 to P4 shown in FIGS. 17A and 18A. However, the symmetrical-composite images W shown in FIGS. 17C and 18C also include the frames P1 to P4 shown in FIGS. 17A and 18A.

FIG. 19 shows the PSNR values obtained when the simple-composite images W and the symmetrical-composite images W are generated by using predetermined frames generating three types of videos A, B, and C and the simple-composite images W and the symmetrical-composite images W are encoded, so as to achieve predetermined bit rates.

According to the encoding result shown in FIG. 19, when the simple-composite images W and the symmetrical-composite images W are encoded, so as to obtain the same bit rate, the PSNR values obtained when the symmetrical-composite images W are encoded (the values shown in columns "b" in FIG. 19) are greater than those obtained when the simple-composite images W are encoded (the values shown in columns "a" in FIG. 19), which indicates that the quality of an image generated when the symmetrical-composite images W are encoded is higher than that of an image generated when the simple-composite images W are encoded. That is to say, when achieving predetermined image quality, the amount of data used when the symmetrical-composite images W are generated and encoded is less than that used when the simple-composite images W are generated and encoded.

That is to say, the encoding device 2 shown in FIG. 15 generates the symmetrical-composite images W by using the videos picked up by the video cameras 1 and encodes the symmetrical-composite images W. Subsequently, the encoding efficiency is increased.

Figure 20:
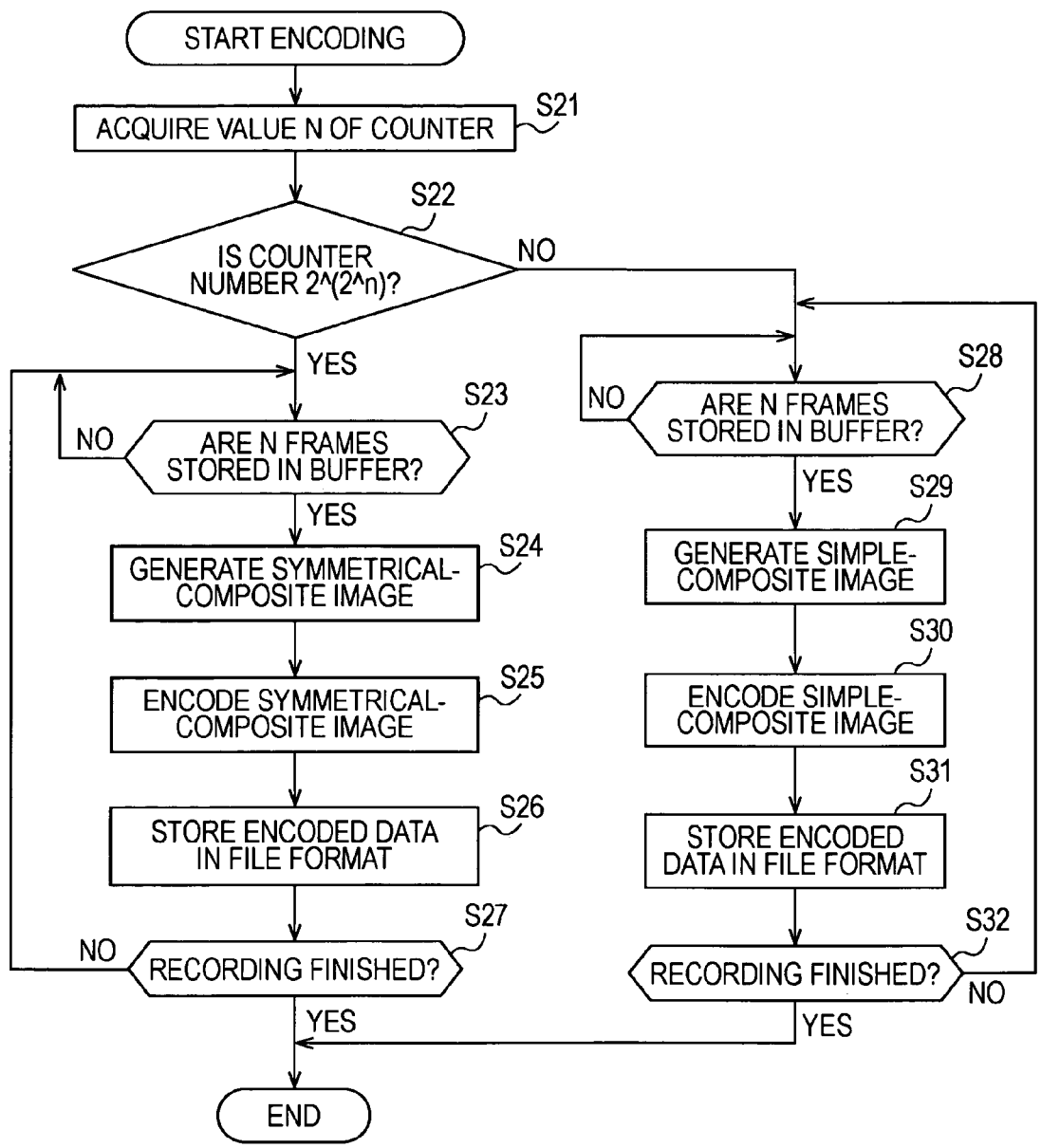
FIG. 20 is a flowchart illustrating another encoding processing.

Operations of the above-described encoding device 2 will be described with reference to a flowchart shown in FIG. 20.

At step S21, the composition unit 101 of the encoding device 2 acquires the value of the counter 13, determines the number N of generation frames which generate the composite image W, determines the resolution of recorded videos and the start-point coordinates of the generation frames, and transmits the above-described information to the encoding unit 14.

At step S22, the composition unit 101 determines whether or not Equation (1) holds. The number of generation frames used for generating the symmetrical-composite image W becomes N which satisfies Equation (1).

[Expression 1]

$$N = 2\hat{0}(2\hat{0}n) \qquad \text{Equation (1)}$$

If it is determined that Equation (1) holds, at step S22, the symmetrical-composite image W is encoded, at steps S23, S24, S25, S26, and S27.

That is to say, at step S23, the composition unit 101 waits until four frames are stored in the buffer 21, for example. When the four frames are stored, the composition unit 101 then advances to step S24.

At step S24, the composition unit 101 reads each of the frames stored in the buffer 21. Then, as shown in FIG. 16C, the composition unit 101 arranges the frame P1 read from the buffer 21-1 on the upper-left part, converts the frame P2 read from the buffer 21-2 into a frame P'2 and arranges the frame P'2 on the upper-right part, where the frame P'2 includes a coordinate system and the x coordinate thereof and that of the frame P1 are line-symmetrical, converts the frame P3 read from the buffer 21-3 into a frame P'3 and arranges the frame P'3 on the lower-left part, where the frame P'3 includes a coordinate system and the y coordinate thereof and that of the frame P1 are line-symmetrical, and converts the frame P4 read from the buffer 21-4 into a frame P'4 and arranges the frame P'4 on the lower-right part, where the frame P'4 includes a coordinate system and the coordinates (x, y) thereof and those of the frame P1 are point-symmetrical, so as to generate the symmetrical-composite image W. The composition unit 101 transmits the generated symmetrical-composite image W to the encoding unit 14.

At step S25, the encoding unit 14 encodes the symmetrical-composite image W transmitted from the composition unit 101 by performing the wavelet transformation.

At step S26, the encoding unit 14 stores data on the symmetrical-composite image W which is encoded, at step S25, into the storing unit D2 of the file format (FIG. 7). When storing the encoded data on the first symmetrical-composite image W, the encoding unit 14 stores the composite information transmitted from the composition unit 101 (step S21) into the storing unit D1.

At step S27, the composition unit 101 determines whether or not the input unit 11 finishes inputting the videos. That is to say, the composition unit 101 determines whether or not recording the videos picked up by the video camera 1 is finished. If it is determined that the video recording is not finished, the processing returns to step S23 so that the processing from then on is performed.

If it is determined that the video recording is finished, at step S27, the encoding performed for the symmetrical-composite image W is finished.

If it is determined that Equation (1) does not hold, at step S22, the simple-composite image W is encoded, at steps S28 to S32.

Figure 9:
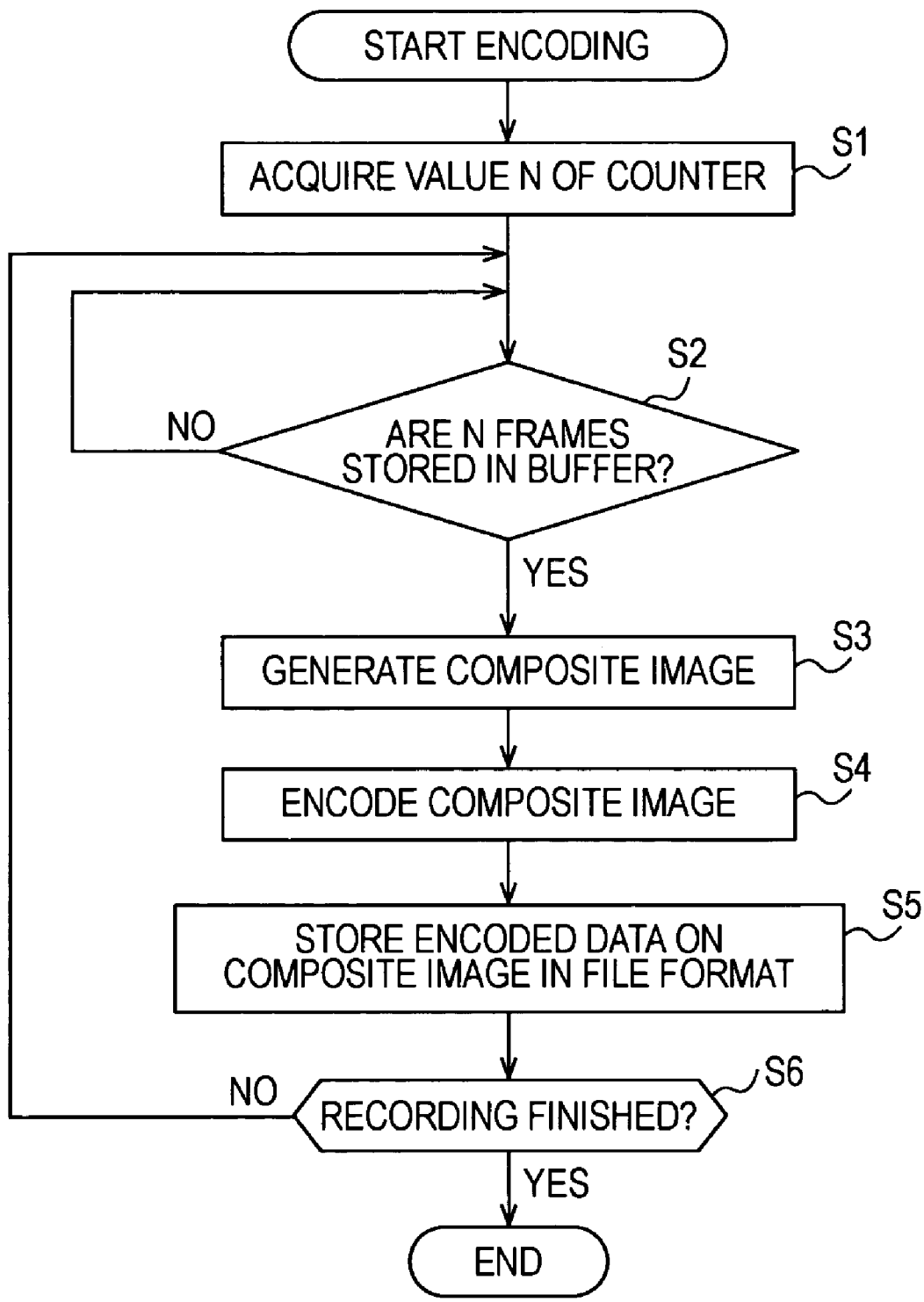
FIG. 9 is a flowchart illustrating the encoding processing.

At steps S28 to S32, the same processing as that performed at steps S2 to S6 shown in FIG. 9 is performed. Therefore, the processing performed at steps S28 to S32 will not be described.

Figure 21:
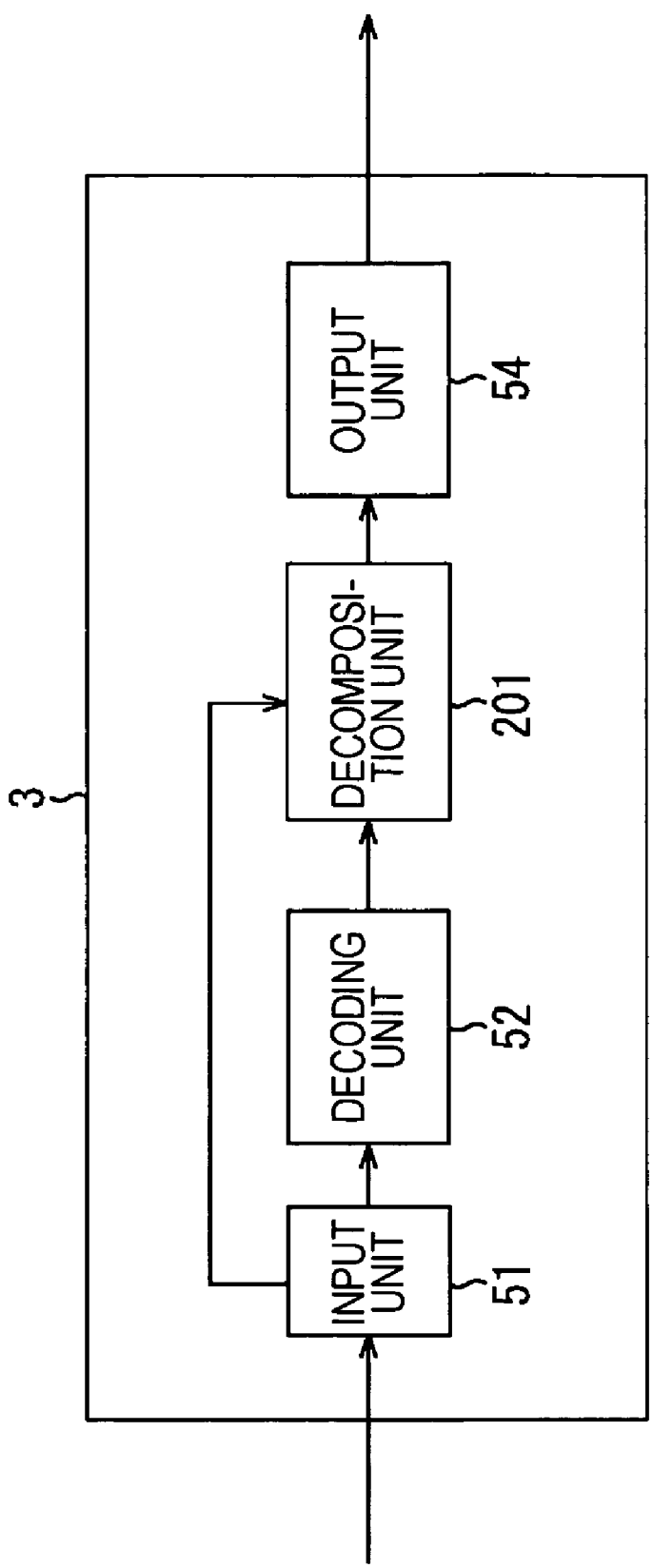
FIG. 21 is a block diagram showing an example configuration of another decoding device according to another embodiment of the present invention.

FIG. 21 shows an example configuration of the decoding device 3 configured to decode data encoded by the encoding device 2 shown in FIG. 15. The decoding device 3 includes a decomposition unit 201 in place of the decomposition unit 53 provided in the decoding device 3 shown in FIG. 10.

Figure 22:
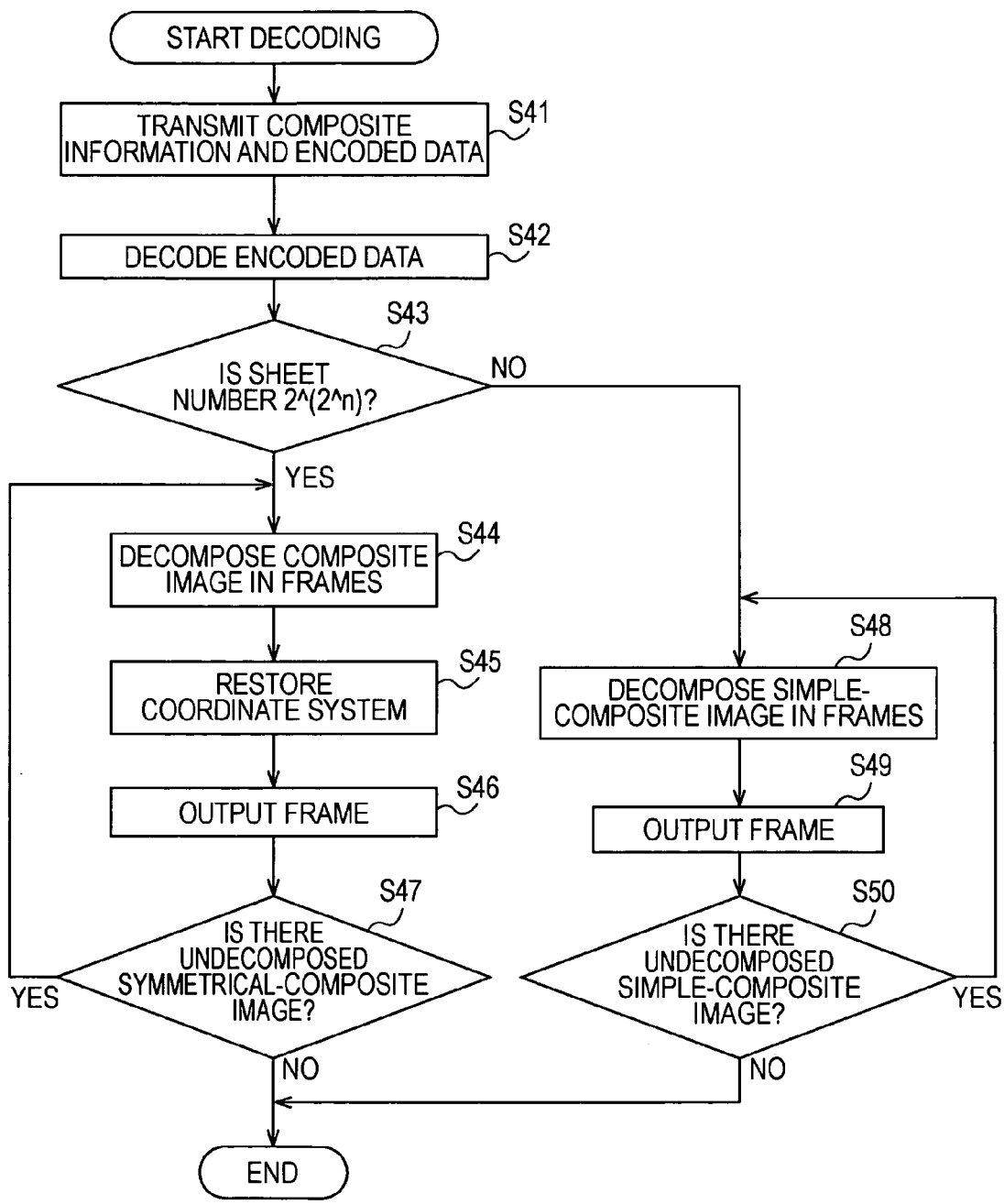
FIG. 22 is a flowchart illustrating another decoding processing.

Operations of the decoding device 3 shown in FIG. 21 will be described with reference to a flowchart shown in FIG. 22.

At step S41, the input unit 51 of the decoding device 3 extracts and transmits the composite information stored in the storing unit D1 (FIG. 7) of the input file data to the decomposition unit 201. Further, the input unit 51 extracts and transmits the encoded data on the composite image W to the decoding unit 52, the encoded data being stored in the storing unit D2 of the file data.

At step S42, the decoding unit 52 decodes the encoded data transmitted from the input unit 51. The decoding unit 52 transmits the image data obtained through the decoding to the decomposition unit 201.

At step S43, the decomposition unit 201 acquires the number N of generation frames included in the composite information transmitted from the input unit 51 and determines whether or not Equation (1) holds.

When it is determined that Equation (1) holds, at step S43, the determination result shows that the symmetrical-composite image W is encoded. The flow then proceeds to step S44 so that the decomposition unit 201 decomposes the image data transmitted from the decoding unit 52 (the image data on the symmetrical-composite image W) into frames.

Upon receiving the image data on the symmetrical-composite image W shown in FIG. 16C, for example, the image data being transmitted from the decoding unit 52, the decomposition unit 201 decomposes the image data on the symmetrical-composite image W into the frames P1, P'2, P'3, and P'4 according to the start-point coordinates and resolution of each of the generation frames of the composite information.

Next, at step S45, the decomposition unit 201 restores the coordinate system of each of the frames P'2, P'3, and P'4 to its original state and obtains the frames P2, P3, and P4. Then, the decomposition unit 201 transmits the frames P1 to P4 to the output unit 54 in sequence.

At step S46, the output unit 54 transmits the frames transmitted from the decomposition unit 201 to the display unit, for example.

At step S47, the decomposition unit 201 determines whether or not image data on the entire symmetrical-composite images W transmitted from the decoding unit 52 is decomposed. If it is determined that the image data on the entire symmetrical-composite images W is not yet decomposed, the decomposition unit 201 returns to step S44 and decomposes image data on the next symmetrical-composite image W. The decomposition unit 201 then advances to step S45 so that the processing from then on is performed in the above-described manner.

If it is determined that the image data on the entire symmetrical-composite images W is decomposed, at step S47, the decoding is terminated.

When it is determined that Equation (1) does not hold, at step S43, the determination result shows that the simple-composite image W is encoded. The decoding is performed at steps S48, S49, and S50.

Figure 11:
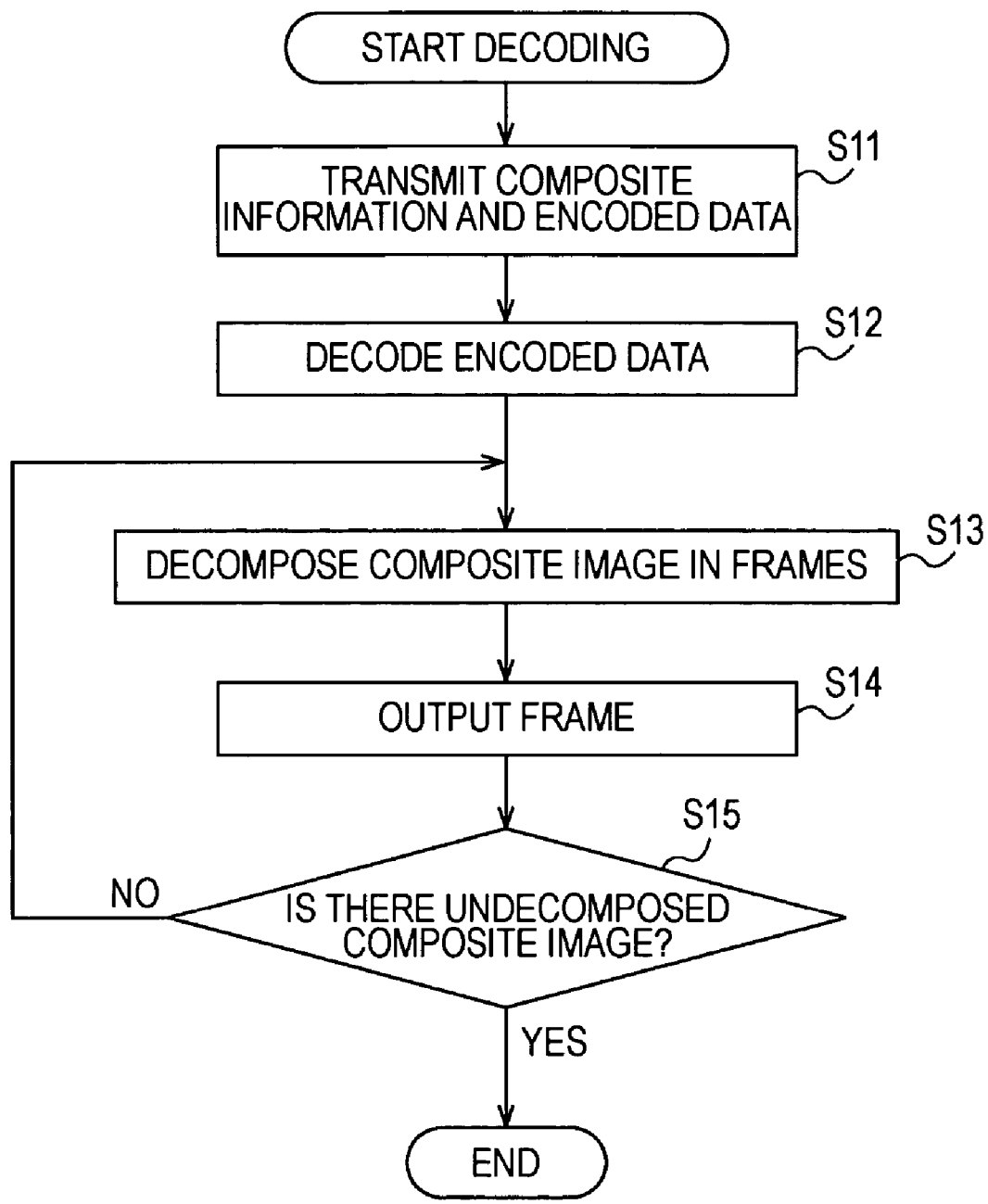
FIG. 11 is a flowchart illustrating decoding processing.

At steps S48 to S50, the same processing as that performed at steps S13 to S15 shown in FIG. 11 is performed. Therefore, the processing performed at steps S48 to S50 will not be described.

Figure 23:
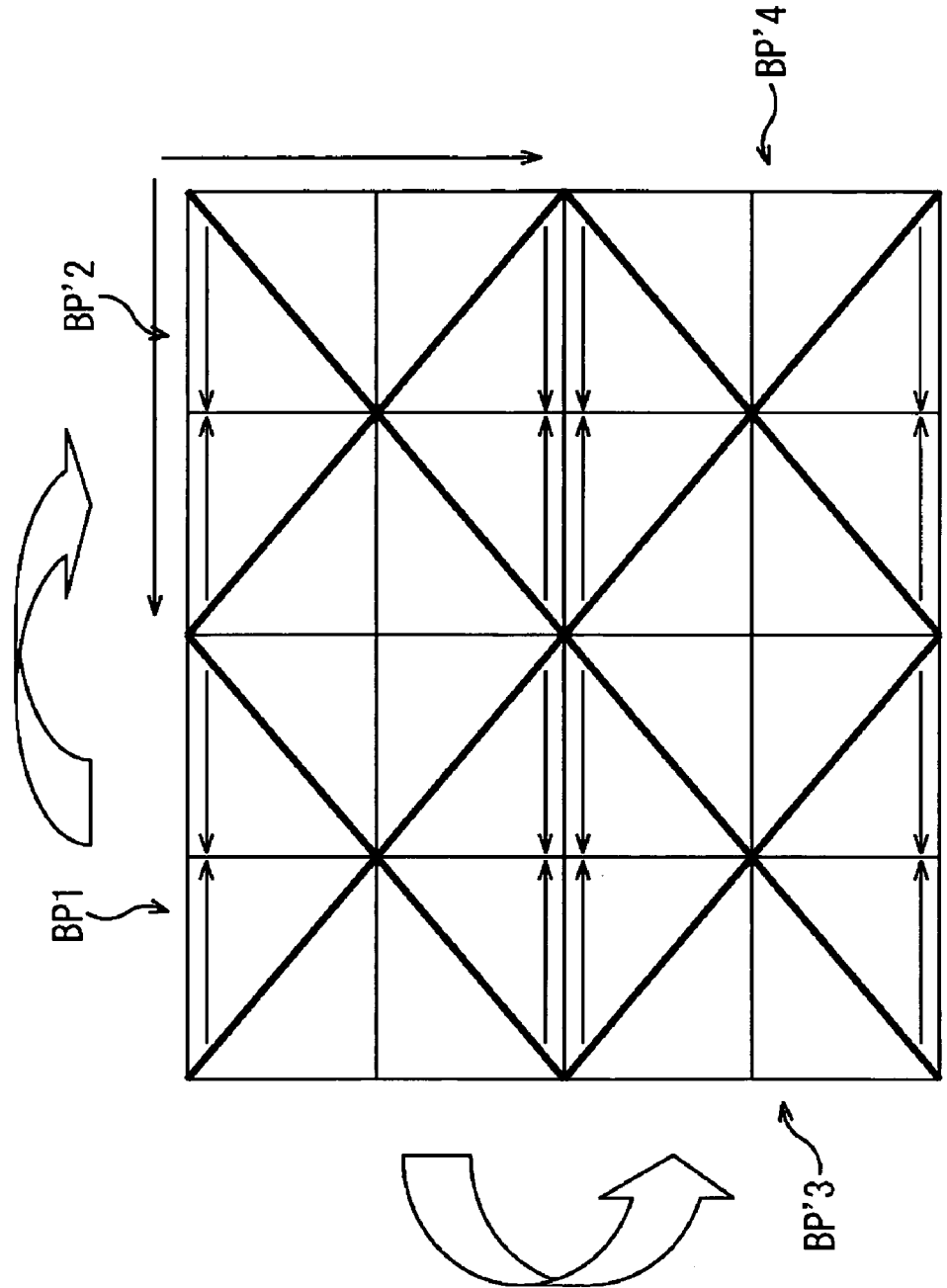
FIG. 23 is another diagram illustrating the encoding processing.

According to the above-described embodiment, the symmetrical-composite image W includes four frames. However, the symmetrical-composite image W may include sixteen frames (when n=2 holds in Equation (1)), as shown in FIG. 23. In that case, a symmetrical-composite image W (large frame BP1) including the first four frames of the sixteen frames is arranged on the upper-left part. Further, a symmetrical-composite image W (large frame BP2) including the next four frames is converted into a large frame BP'2 including a coordinate system, wherein the x coordinate of the coordinate system and that of the large frame BP1 are line-symmetrical, and the large frame BP'2 is arranged on the upper-right part. Further, a symmetrical-composite image W (large frame BP3) including the further next four frames is converted into a large frame BP'3 including a coordinate system, wherein the y coordinate of the coordinate system and that of the large frame BP1 are line-symmetrical, and the large frame BP'3 is arranged on the lower-left part. Still further, a symmetrical-composite image W (large frame BP4) including the further next four frames is converted into a large frame BP'4 including a coordinate system, wherein the coordinate system and that of the large frame BP1 are point-symmetrical, and the large frame BP'4 is arranged on the lower-right part. Subsequently, the symmetrical-composite image W is generated.

The above-described series of processing procedures including the encoding and decoding may be performed by using purpose-built hardware or software. When the series of processing procedures are performed by using the software, the series of processing procedures may be achieved by making a (personal) computer shown in FIG. 24 execute a program, for example.

In FIG. 24, a central processing unit (CPU) 511 performs various processing procedures according to a program stored in a read-only memory (ROM) 512, or a program loaded from a hard disk 514 into a random-access memory (RAM) 513. The RAM 513 also stores data or the like used by the CPU 511, so as to perform the various processing procedures.

The CPU 511, the ROM 512, and the RAM 513 are connected to one another via a bus 515. An input-and-output interface 516 is also connected to the bus 515.

The input-and-output interface 516 is further connected to an input unit 518 including a keyboard, a mouse, an input end, and so forth, an output unit 517 including a display having a cathode ray tube (CRT), a liquid-crystal display (LCD), and so forth, an output end, a speaker, and so forth, and a communication unit 519 including a terminal adapter, an asymmetric-digital-subscriber-line (ADSL) modem, a local-area-network (LAN) card, and so forth. The communication unit 519 performs communications via various types of networks including the Internet, for example.

A drive 520 is also connected to the input-and-output interface 516. A magnetic disk (including a flexible disk) 531, an optical disk (including a compact disk-read only memory (CD-ROM) and a digital versatile disk (DVD)) 532, a magneto-optical disk (including a mini-disk (MD)) 533, and a removable medium (recording medium) 534 such as a semiconductor memory are mounted on the drive 520, as needed. A computer program read from the above-described disks and medium is installed on the hard disk 514, as required.

Further, in this specification, steps written in the flowcharts include not only processing executed in time sequence according to the written order but also processing that is not necessarily executed in time sequence but can be executed in parallel and/or separately.

It should be understood by those skilled in the art that various modifications, combinations, sub-combinations and alterations may occur depending on design requirements and other factors insofar as they are within the scope of the appended claims or the equivalents thereof.

What is claimed is:

1. An encoding device configured to encode video by performing intra-frame encoding using wavelet transformation, the encoding device comprising:
    a receiving unit configured to receive n images captured by at least one camera;
    an image processor configured to generate a composite image for the n images, the composite image comprising a first image, a second image being symmetrical to the first image about a y-axis, a third image being symmetrical to the first image about an x-axis, and a fourth image being symmetrical to the first image about an origin, the first, second, third, and fourth images being arranged in a lattice; and
    an encoder configured to perform the encoding for the composite image.

2. The encoding device according to claim 1, further comprising:
    storage means configured to store data on the composite image encoded by the encoder,
    wherein the storage means stores information about a structure of the composite image in addition to the encoded data.

3. An encoding method adapted to encode video by performing intra-frame encoding using wavelet transformation, the encoding method comprising the steps of:
    receiving n images captured by at least one camera;
    generating a composite image for the n images, the composite image comprising a first image, a second image being symmetrical to the first image about a y-axis, a third image being symmetrical to the first image about an x-axis, and a fourth image being symmetrical to the first image about an origin, the first, second, third, and fourth images being arranged in a lattice; and
    performing the encoding for the composite image.

4. A non-transitory computer-readable storage medium for controlling an encoding device configured to encode video by performing intra-frame encoding using wavelet transformation, the storage medium containing instructions for:
    receiving n images captured by at least one camera;
    generating a composite image for the n images, the composite image comprising a first image, a second image being symmetrical to the first image about a y-axis, a third image being symmetrical to the first image about an x-axis, and a fourth image being symmetrical to the first image about an origin, the first, second, third, and fourth images being arranged in a lattice; and
    performing the encoding for the composite image.

5. A decoding device configured to decode encoded data obtained by receiving n images captured by at least one camera and encoding a composite image for the n images by performing intra-frame encoding using wavelet transformation, the composite image comprising a first image, a second image being symmetrical to the first image about a y-axis, a third image being symmetrical to the first image about an x-axis, and a fourth image being symmetrical to the first image about an origin, the first, second, third, and fourth images being arranged in a lattice, the decoding device comprising:
    decoding means configured to decode the encoded data;
    decomposition means configured to decompose image data on the composite image into the n images, the composite-image data being obtained through the decoding; and
    output means configured to output the images decomposed by the decomposition means.

6. The decoding device according to claim 5, further comprising:
    conversion means configured to restore a coordinate system of each of the n images decomposed by the decomposition means to the original state of the coordinate system.

7. A decoding method adapted to decode encoded data obtained by receiving n images captured by at least one camera and encoding a composite image for the n images by performing intra-frame encoding using wavelet transformation, the composite image comprising a first image, a second image being symmetrical to the first image about a y-axis, a third image being symmetrical to the first image about an x-axis, and a fourth image being symmetrical to the first image about an origin, the first, second, third, and fourth images being arranged in a lattice, the decoding method comprising the steps of:
    decoding the encoded data;
    decomposing image data on the composite image into the n images, the composite-image data being obtained through the decoding; and
    outputting the images decomposed at the decomposition step.

8. A non-transitory computer-readable storage medium for controlling a decoding device which decodes encoded data obtained by receiving n images captured by at least one camera and encoding a composite image for the n images by performing intra-frame encoding using wavelet transformation, the composite image comprising a first image, a second image being symmetrical to the first image about a y-axis, a third image being symmetrical to the first image about an x-axis, and a fourth image being symmetrical to the first image about an origin, the first, second, third, and fourth images being arranged in a lattice, the storage medium containing instructions for:
    decoding the encoded data;
    decomposing image data on the composite image into the n images, the composite-image data being obtained through the decoding; and
    outputting the images decomposed at the decomposition step.

9. An encoding device configured to encode video by performing intra-frame encoding using wavelet transformation, the encoding device comprising:
    a receiving unit configured to receive n images captured by at least one camera;
    a generation unit configured to generate a composite image for the n images, the composite image comprising a first image, a second image being symmetrical to the first image about a y-axis, a third image being symmetrical to the first image about an x-axis, and a fourth image being symmetrical to the first image about an origin, the first, second, third, and fourth images being arranged in a lattice; and an encoding unit configured to perform the encoding for the composite image.

10. A decoding device configured to decode encoded data obtained by receiving n images captured by at least one camera and performing intra-frame encoding using wavelet transformation of a composite image for the n images, the composite image comprising a first image, a second image being symmetrical to the first image about a y-axis, a third image being symmetrical to the first image about an x-axis, and a fourth image being symmetrical to the first image about an origin, the first, second, third, and fourth images being arranged in a lattice, the decoding device comprising:

a decoding unit configured to decode the encoded data;

a decomposition unit configured to decompose image data on the composite image into the n images, the composite-image data being obtained through the decoding; and an output unit configured to output the n images decomposed by the decomposition unit.

* * * * *

UNITED STATES PATENT AND TRADEMARK OFFICE
CERTIFICATE OF CORRECTION

PATENT NO.        : 8,086,056 B2
APPLICATION NO.   : 11/408058
DATED             : December 27, 2011
INVENTOR(S)       : Kenji Yamane et al.

It is certified that error appears in the above-identified patent and that said Letters Patent is hereby corrected as shown below:

ON THE TITLE PAGE:

Insert --(73) Assignee: Sony Corporation, Tokyo (JP)--.

Signed and Sealed this
Twelfth Day of June, 2012

David J. Kappos
*Director of the United States Patent and Trademark Office*